United States Patent
Walsh et al.

(10) Patent No.: US 8,739,296 B2
(45) Date of Patent: *May 27, 2014

(54) SYSTEM AND METHOD FOR SOCIAL NETWORK TRUST ASSESSMENT

(75) Inventors: Richard Walsh, Raleigh, NC (US);
Christopher Amidon, Apex, NC (US);
Alfredo Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/561,361

(22) Filed: Jul. 30, 2012

(65) Prior Publication Data
US 2012/0291137 A1    Nov. 15, 2012

Related U.S. Application Data

(63) Continuation of application No. 13/008,535, filed on Jan. 18, 2011, now Pat. No. 8,276,207, which is a continuation of application No. 11/363,910, filed on Dec. 11, 2006, now Pat. No. 7,886,334.

(51) Int. Cl.
*G06F 7/04* (2006.01)
*G06F 17/30* (2006.01)
*G06F 15/16* (2006.01)
*G06F 11/00* (2006.01)

(52) U.S. Cl.
USPC ............ 726/26; 709/204; 726/1; 726/22; 713/166

(58) Field of Classification Search
None
See application file for complete search history.

(56) References Cited

U.S. PATENT DOCUMENTS

| | | |
|---|---|---|
| 5,220,657 A | 6/1993 | Bly et al. |
| 5,517,617 A | 5/1996 | Sathaye et al. |
| 5,537,586 A | 7/1996 | Amram et al. |

(Continued)

FOREIGN PATENT DOCUMENTS

| | | |
|---|---|---|
| EP | 1117056 A2 | 7/2001 |
| EP | 1338966 A3 | 1/2005 |

(Continued)

OTHER PUBLICATIONS

Brickley, D., et al., "FOAF Vocabulary Specification," 2005, accessed Feb. 20, 2007, 42 pages, http://xmlns.com/foaf/0.1/.

(Continued)

*Primary Examiner* — Christopher Revak
*Assistant Examiner* — Trang Doan
(74) *Attorney, Agent, or Firm* — Withrow & Terranova, PLLC

(57) ABSTRACT

A first user's trust level with regard to a second user can be determined by providing questions to the second user, with the questions based on a previously-collected knowledge base including information about the first user. The information about the first user may be partitioned into levels of trust, and the second user's responses to the questions may be evaluated to determine which level of trust the second user is entitled to. The knowledge base may be assembled by prompting the first user for information and/or by scanning or otherwise collecting already-existing data about the first user. The knowledge base and/or trust assessment may be distributed across a network, and in some embodiments the knowledge base or parts thereof is distributed to other users according to the trust level of those users.

11 Claims, 4 Drawing Sheets

(56) References Cited

U.S. PATENT DOCUMENTS

| | | |
|---|---|---|
| 5,629,980 A | 5/1997 | Stefik et al. |
| 5,717,923 A | 2/1998 | Dedrick |
| 5,749,081 A | 5/1998 | Whiteis |
| 5,754,939 A | 5/1998 | Herz et al. |
| 5,867,799 A | 2/1999 | Lang et al. |
| 5,884,035 A | 3/1999 | Butman et al. |
| 5,983,214 A | 11/1999 | Lang et al. |
| 6,073,138 A | 6/2000 | de l'Etraz et al. |
| 6,088,702 A | 7/2000 | Plantz et al. |
| 6,092,049 A | 7/2000 | Chislenko et al. |
| 6,151,624 A | 11/2000 | Teare et al. |
| 6,195,696 B1 | 2/2001 | Baber et al. |
| 6,260,069 B1 | 7/2001 | Anglin |
| 6,275,819 B1 | 8/2001 | Carter |
| 6,301,609 B1 | 10/2001 | Aravamudan et al. |
| 6,308,175 B1 | 10/2001 | Lang et al. |
| 6,311,194 B1 | 10/2001 | Sheth et al. |
| 6,314,409 B2 | 11/2001 | Schneck et al. |
| 6,327,590 B1 | 12/2001 | Chidlovskii et al. |
| 6,338,086 B1 | 1/2002 | Curtis et al. |
| 6,374,290 B1 | 4/2002 | Scharber et al. |
| 6,385,619 B1 | 5/2002 | Eichstaedt et al. |
| 6,389,409 B1 | 5/2002 | Horovitz et al. |
| 6,389,541 B1 | 5/2002 | Patterson |
| 6,421,439 B1 | 7/2002 | Liffick |
| 6,438,579 B1 | 8/2002 | Hosken |
| 6,442,693 B1 | 8/2002 | Sandgren et al. |
| 6,463,433 B1 | 10/2002 | Baclawski |
| 6,480,885 B1 | 11/2002 | Olivier |
| 6,493,703 B1 | 12/2002 | Knight et al. |
| 6,498,795 B1 | 12/2002 | Zhang et al. |
| 6,519,629 B2 | 2/2003 | Harvey et al. |
| 6,525,747 B1 | 2/2003 | Bezos |
| 6,526,411 B1 | 2/2003 | Ward |
| 6,539,375 B2 | 3/2003 | Kawasaki |
| 6,553,367 B2 | 4/2003 | Horovitz et al. |
| 6,560,578 B2 | 5/2003 | Eldering |
| 6,567,122 B1 | 5/2003 | Anderson et al. |
| 6,577,607 B1 | 6/2003 | Mitts et al. |
| 6,581,072 B1 | 6/2003 | Mathur et al. |
| 6,594,693 B1 | 7/2003 | Borwankar |
| 6,606,644 B1 | 8/2003 | Ford et al. |
| 6,629,100 B2 | 9/2003 | Morris et al. |
| 6,630,944 B1 | 10/2003 | Kakuta et al. |
| 6,631,098 B2 | 10/2003 | Chang et al. |
| 6,651,086 B1 | 11/2003 | Manber et al. |
| 6,654,735 B1 | 11/2003 | Eichstaedt et al. |
| 6,687,732 B1 | 2/2004 | Bector et al. |
| 6,701,362 B1 | 3/2004 | Subramonian et al. |
| 6,745,178 B1 | 6/2004 | Emens et al. |
| 6,748,420 B1 | 6/2004 | Quatrano et al. |
| 6,757,517 B2 | 6/2004 | Chang |
| 6,772,160 B2 | 8/2004 | Cho et al. |
| 6,785,704 B1 | 8/2004 | McCanne |
| 6,816,906 B1 | 11/2004 | Icken et al. |
| 6,829,569 B1 | 12/2004 | Drucker et al. |
| 6,832,245 B1 | 12/2004 | Isaacs et al. |
| 6,839,680 B1 | 1/2005 | Liu et al. |
| 6,854,069 B2 | 2/2005 | Kampe et al. |
| 6,859,807 B1 | 2/2005 | Knight et al. |
| 6,917,944 B1 | 7/2005 | Prasad et al. |
| 6,957,193 B2 | 10/2005 | Stefik et al. |
| 6,959,290 B2 | 10/2005 | Stefik et al. |
| 6,970,444 B2 | 11/2005 | Chwieseni et al. |
| 6,970,840 B1 | 11/2005 | Yu et al. |
| 6,988,096 B2 | 1/2006 | Gupta et al. |
| 6,988,127 B2 | 1/2006 | Matsuda et al. |
| 6,993,564 B2 | 1/2006 | Whitten, II |
| 7,006,999 B1 | 2/2006 | Huberman et al. |
| 7,016,307 B2 | 3/2006 | Vasudev et al. |
| 7,024,391 B2 | 4/2006 | Burich |
| 7,039,639 B2 | 5/2006 | Brezin et al. |
| 7,043,644 B2 | 5/2006 | DeBruine |
| 7,047,202 B2 | 5/2006 | Jaipuria et al. |
| 7,047,406 B2 | 5/2006 | Schleicher et al. |
| 7,051,003 B1 | 5/2006 | Kobata et al. |
| 7,054,900 B1 | 5/2006 | Goldston |
| 7,058,606 B2 | 6/2006 | Stefik et al. |
| 7,058,897 B2 | 6/2006 | Matsuda |
| 7,069,308 B2 | 6/2006 | Abrams |
| 7,069,318 B2 | 6/2006 | Burbeck et al. |
| 7,092,952 B1 | 8/2006 | Wilens |
| 7,103,634 B1 | 9/2006 | Ullmann et al. |
| 7,107,317 B2 | 9/2006 | Demsky et al. |
| 7,117,254 B2 | 10/2006 | Lunt et al. |
| 7,120,681 B2 | 10/2006 | Frelechoux et al. |
| 7,150,030 B1 | 12/2006 | Eldering et al. |
| 7,302,429 B1 | 11/2007 | Wanker |
| 7,313,399 B2 | 12/2007 | Rhee et al. |
| 7,370,015 B2 | 5/2008 | Gvily |
| 7,526,458 B2 | 4/2009 | Flinn et al. |
| 7,594,244 B2 | 9/2009 | Scholl et al. |
| 7,685,135 B2 | 3/2010 | Brooke et al. |
| 7,689,556 B2 | 3/2010 | Garg et al. |
| 7,698,301 B2 | 4/2010 | Lourdeaux |
| 7,716,220 B2 | 5/2010 | Michelitsch et al. |
| 7,720,916 B2 | 5/2010 | Fisher et al. |
| 7,860,019 B2 | 12/2010 | Zhang et al. |
| 2001/0007099 A1 | 7/2001 | Rau et al. |
| 2001/0042043 A1 | 11/2001 | Shear et al. |
| 2002/0028395 A1 | 3/2002 | Tanaka et al. |
| 2002/0032634 A1 | 3/2002 | Abrams et al. |
| 2002/0052885 A1 | 5/2002 | Levy |
| 2002/0057284 A1 | 5/2002 | Dalby et al. |
| 2002/0077985 A1 | 6/2002 | Kobata et al. |
| 2002/0078206 A1 | 6/2002 | Boies et al. |
| 2002/0091556 A1 | 7/2002 | Fiala et al. |
| 2002/0091667 A1 | 7/2002 | Jaipuria et al. |
| 2002/0091975 A1 | 7/2002 | Redlich et al. |
| 2002/0107721 A1 | 8/2002 | Darwent et al. |
| 2002/0116466 A1 | 8/2002 | Trevithick et al. |
| 2002/0124053 A1 | 9/2002 | Adams et al. |
| 2002/0133550 A1* | 9/2002 | Mears et al. ................. 709/204 |
| 2002/0138744 A1 | 9/2002 | Schleicher et al. |
| 2002/0152322 A1 | 10/2002 | Hay |
| 2002/0156875 A1 | 10/2002 | Pabla |
| 2002/0156893 A1 | 10/2002 | Pouyoul et al. |
| 2002/0156917 A1 | 10/2002 | Nye |
| 2002/0169737 A1 | 11/2002 | Armstrong et al. |
| 2002/0178164 A1 | 11/2002 | Wisniewski |
| 2003/0002521 A1 | 1/2003 | Traversat et al. |
| 2003/0009423 A1 | 1/2003 | Wang et al. |
| 2003/0014482 A1 | 1/2003 | Toyota et al. |
| 2003/0018582 A1 | 1/2003 | Yaacovi |
| 2003/0018968 A1 | 1/2003 | Avnet |
| 2003/0028596 A1 | 2/2003 | Toyota et al. |
| 2003/0028639 A1 | 2/2003 | Yamamoto et al. |
| 2003/0046587 A1 | 3/2003 | Bheemarasetti et al. |
| 2003/0050976 A1 | 3/2003 | Block et al. |
| 2003/0050977 A1 | 3/2003 | Puthenkulam et al. |
| 2003/0055892 A1 | 3/2003 | Huitema et al. |
| 2003/0061282 A1 | 3/2003 | Ebata et al. |
| 2003/0064693 A1 | 4/2003 | Sternberg |
| 2003/0079120 A1 | 4/2003 | Hearn et al. |
| 2003/0084162 A1 | 5/2003 | Johnson et al. |
| 2003/0093520 A1 | 5/2003 | Beesley |
| 2003/0101449 A1 | 5/2003 | Bentolila et al. |
| 2003/0105812 A1 | 6/2003 | Flowers, Jr. et al. |
| 2003/0112823 A1 | 6/2003 | Collins et al. |
| 2003/0120662 A1 | 6/2003 | Vishik |
| 2003/0120680 A1 | 6/2003 | Agrawal et al. |
| 2003/0135576 A1 | 7/2003 | Bodin |
| 2003/0163597 A1 | 8/2003 | Hellman et al. |
| 2003/0167324 A1 | 9/2003 | Farnham et al. |
| 2003/0171941 A1 | 9/2003 | Kraenzel et al. |
| 2003/0172034 A1 | 9/2003 | Schneck et al. |
| 2003/0179228 A1 | 9/2003 | Schreiber et al. |
| 2003/0182421 A1 | 9/2003 | Faybishenko et al. |
| 2003/0185421 A1 | 10/2003 | Okamoto et al. |
| 2003/0191814 A1 | 10/2003 | Tran |
| 2003/0195851 A1 | 10/2003 | Ong |
| 2003/0195924 A1 | 10/2003 | Franke et al. |
| 2003/0200190 A1 | 10/2003 | Adar et al. |
| 2003/0204605 A1 | 10/2003 | Hudson et al. |

(56) References Cited

U.S. PATENT DOCUMENTS

| | | |
|---|---|---|
| 2003/0212680 A1 | 11/2003 | Bates et al. |
| 2003/0220975 A1 | 11/2003 | Malik |
| 2003/0220980 A1 | 11/2003 | Crane |
| 2004/0015553 A1 | 1/2004 | Griffin et al. |
| 2004/0019846 A1 | 1/2004 | Castellani et al. |
| 2004/0024719 A1 | 2/2004 | Adar et al. |
| 2004/0024720 A1 | 2/2004 | Fairweather |
| 2004/0024892 A1 | 2/2004 | Creswell et al. |
| 2004/0032393 A1 | 2/2004 | Brandenberg et al. |
| 2004/0039913 A1 | 2/2004 | Kruse |
| 2004/0044727 A1 | 3/2004 | Abdelaziz et al. |
| 2004/0044774 A1 | 3/2004 | Mangalik et al. |
| 2004/0054723 A1 | 3/2004 | Dayal et al. |
| 2004/0059705 A1 | 3/2004 | Wittke et al. |
| 2004/0064416 A1 | 4/2004 | Peled et al. |
| 2004/0064568 A1 | 4/2004 | Arora et al. |
| 2004/0064693 A1 | 4/2004 | Pabla et al. |
| 2004/0073659 A1 | 4/2004 | Rajsic et al. |
| 2004/0081105 A1 | 4/2004 | Shimazaki et al. |
| 2004/0088325 A1 | 5/2004 | Elder et al. |
| 2004/0103044 A1 | 5/2004 | Vandewater et al. |
| 2004/0122696 A1 | 6/2004 | Beringer |
| 2004/0122803 A1 | 6/2004 | Dom et al. |
| 2004/0122822 A1 | 6/2004 | Thompson et al. |
| 2004/0122855 A1 | 6/2004 | Ruvolo et al. |
| 2004/0122958 A1 | 6/2004 | Wardrop |
| 2004/0137882 A1 | 7/2004 | Forsyth |
| 2004/0148275 A1 | 7/2004 | Achlioptas |
| 2004/0148434 A1 | 7/2004 | Matsubara et al. |
| 2004/0148503 A1 | 7/2004 | Sidman |
| 2004/0162871 A1 | 8/2004 | Pabla et al. |
| 2004/0181487 A1 | 9/2004 | Hanson |
| 2004/0181540 A1 | 9/2004 | Jung et al. |
| 2004/0193680 A1 | 9/2004 | Gibbs et al. |
| 2004/0205358 A1 | 10/2004 | Erickson |
| 2004/0210535 A1 | 10/2004 | Erickson |
| 2004/0215793 A1 | 10/2004 | Ryan et al. |
| 2004/0220893 A1 | 11/2004 | Spivack et al. |
| 2004/0237045 A1 | 11/2004 | Meltzer |
| 2004/0249768 A1 | 12/2004 | Kontio et al. |
| 2004/0267625 A1 | 12/2004 | Feng et al. |
| 2005/0013298 A1 | 1/2005 | Srisuresh et al. |
| 2005/0015357 A1 | 1/2005 | Shahidi |
| 2005/0021096 A1 | 1/2005 | Mower |
| 2005/0031096 A1 | 2/2005 | Postrel |
| 2005/0034107 A1 | 2/2005 | Kendall et al. |
| 2005/0044361 A1 | 2/2005 | Chang et al. |
| 2005/0044411 A1 | 2/2005 | Somin et al. |
| 2005/0052998 A1 | 3/2005 | Oliver et al. |
| 2005/0076365 A1 | 4/2005 | Popov et al. |
| 2005/0080655 A1 | 4/2005 | Sengir et al. |
| 2005/0086300 A1 | 4/2005 | Yeager et al. |
| 2005/0091289 A1 | 4/2005 | Shappell et al. |
| 2005/0091316 A1 | 4/2005 | Ponce et al. |
| 2005/0094313 A1 | 5/2005 | Kim |
| 2005/0097170 A1 | 5/2005 | Zhu et al. |
| 2005/0097320 A1 | 5/2005 | Golan et al. |
| 2005/0114783 A1 | 5/2005 | Szeto |
| 2005/0131762 A1 | 6/2005 | Bharat et al. |
| 2005/0138430 A1 | 6/2005 | Landsman |
| 2005/0149621 A1 | 7/2005 | Kirkland et al. |
| 2005/0154701 A1 | 7/2005 | Parunak et al. |
| 2005/0159970 A1 | 7/2005 | Buyukkokten et al. |
| 2005/0159998 A1 | 7/2005 | Buyukkokten et al. |
| 2005/0163135 A1 | 7/2005 | Hopkins |
| 2005/0165715 A1 | 7/2005 | Farnham et al. |
| 2005/0165726 A1 | 7/2005 | Kawell, Jr. et al. |
| 2005/0171799 A1 | 8/2005 | Hull et al. |
| 2005/0171832 A1 | 8/2005 | Hull et al. |
| 2005/0171954 A1 | 8/2005 | Hull et al. |
| 2005/0171955 A1 | 8/2005 | Hull et al. |
| 2005/0172001 A1 | 8/2005 | Zaner et al. |
| 2005/0172116 A1 | 8/2005 | Burch et al. |
| 2005/0177385 A1 | 8/2005 | Hull et al. |
| 2005/0177614 A1 | 8/2005 | Bourne |
| 2005/0197846 A1 | 9/2005 | Pezaris et al. |
| 2005/0198031 A1 | 9/2005 | Pezaris et al. |
| 2005/0198131 A1 | 9/2005 | Appelman et al. |
| 2005/0198172 A1 | 9/2005 | Appelman et al. |
| 2005/0198290 A1 | 9/2005 | Berkey et al. |
| 2005/0198305 A1 | 9/2005 | Pezaris et al. |
| 2005/0201290 A1 | 9/2005 | Vasudev et al. |
| 2005/0203801 A1 | 9/2005 | Morgenstern et al. |
| 2005/0204038 A1 | 9/2005 | Medvinsky et al. |
| 2005/0209999 A1 | 9/2005 | Jou |
| 2005/0210104 A1 | 9/2005 | Torvinen |
| 2005/0210387 A1 | 9/2005 | Alagappan et al. |
| 2005/0210409 A1 | 9/2005 | Jou |
| 2005/0216300 A1 | 9/2005 | Appelman et al. |
| 2005/0216550 A1 | 9/2005 | Paseman et al. |
| 2005/0226511 A1 | 10/2005 | Short |
| 2005/0229243 A1 | 10/2005 | Svendsen et al. |
| 2005/0232423 A1 | 10/2005 | Horvitz et al. |
| 2005/0234864 A1 | 10/2005 | Shapiro |
| 2005/0235062 A1 | 10/2005 | Lunt et al. |
| 2005/0240773 A1 | 10/2005 | Hilbert et al. |
| 2005/0243736 A1 | 11/2005 | Faloutsos et al. |
| 2005/0246420 A1 | 11/2005 | Little, II |
| 2005/0251553 A1 | 11/2005 | Gottfried |
| 2005/0256866 A1 | 11/2005 | Lu et al. |
| 2005/0256909 A1 | 11/2005 | Aboulhosn et al. |
| 2005/0262162 A1 | 11/2005 | Levy |
| 2005/0262199 A1 | 11/2005 | Chen et al. |
| 2005/0262246 A1 | 11/2005 | Menon et al. |
| 2005/0262530 A1 | 11/2005 | Ruetschi et al. |
| 2005/0266835 A1 | 12/2005 | Agrawal et al. |
| 2005/0267766 A1 | 12/2005 | Galbreath et al. |
| 2005/0267940 A1 | 12/2005 | Galbreath et al. |
| 2005/0268151 A1 | 12/2005 | Hunt et al. |
| 2005/0283497 A1 | 12/2005 | Nurminen et al. |
| 2005/0289648 A1 | 12/2005 | Grobman et al. |
| 2006/0004789 A1 | 1/2006 | Lunt et al. |
| 2006/0004892 A1 | 1/2006 | Lunt et al. |
| 2006/0009994 A1 | 1/2006 | Hogg et al. |
| 2006/0010225 A1 | 1/2006 | Issa |
| 2006/0015588 A1 | 1/2006 | Achlioptas et al. |
| 2006/0020792 A1* | 1/2006 | Weiss ........................ 713/168 |
| 2006/0020960 A1 | 1/2006 | Relan et al. |
| 2006/0021009 A1 | 1/2006 | Lunt |
| 2006/0026235 A1 | 2/2006 | Schwarz et al. |
| 2006/0031489 A1 | 2/2006 | Marcjan |
| 2006/0031770 A1 | 2/2006 | McMenamin |
| 2006/0035766 A1 | 2/2006 | Towley, III et al. |
| 2006/0036641 A1 | 2/2006 | Brydon et al. |
| 2006/0036766 A1 | 2/2006 | Baupin et al. |
| 2006/0041543 A1 | 2/2006 | Achlioptas |
| 2006/0042483 A1 | 3/2006 | Work et al. |
| 2006/0047839 A1 | 3/2006 | Tate et al. |
| 2006/0048059 A1 | 3/2006 | Etkin |
| 2006/0053380 A1 | 3/2006 | Spataro et al. |
| 2006/0064431 A1 | 3/2006 | Kishore et al. |
| 2006/0085248 A1 | 4/2006 | Arnett et al. |
| 2006/0085818 A1 | 4/2006 | Bodlaender et al. |
| 2006/0089913 A1 | 4/2006 | Jaipuria et al. |
| 2006/0090137 A1 | 4/2006 | Cheng et al. |
| 2006/0095514 A1 | 5/2006 | Wang et al. |
| 2006/0095792 A1 | 5/2006 | Hurtado et al. |
| 2006/0095976 A1 | 5/2006 | Torres et al. |
| 2006/0107286 A1 | 5/2006 | Connor et al. |
| 2006/0112111 A1 | 5/2006 | Tseng et al. |
| 2006/0117090 A1 | 6/2006 | Schellingerhout et al. |
| 2006/0117378 A1 | 6/2006 | Tam et al. |
| 2006/0121987 A1 | 6/2006 | Bortnik et al. |
| 2006/0121988 A1 | 6/2006 | Reville et al. |
| 2006/0123127 A1 | 6/2006 | Littlefield |
| 2006/0136419 A1 | 6/2006 | Brydon et al. |
| 2006/0136551 A1 | 6/2006 | Amidon et al. |
| 2006/0143067 A1 | 6/2006 | Calabria |
| 2006/0143068 A1 | 6/2006 | Calabria |
| 2006/0143084 A1 | 6/2006 | Donnelli et al. |
| 2006/0143183 A1 | 6/2006 | Goldberg et al. |
| 2006/0143236 A1 | 6/2006 | Wu |
| 2006/0146765 A1 | 7/2006 | Van De Sluis et al. |
| 2006/0155813 A1 | 7/2006 | Dietz et al. |

(56) References Cited

U.S. PATENT DOCUMENTS

| | | |
|---|---|---|
| 2006/0161553 A1 | 7/2006 | Woo |
| 2006/0167804 A1 | 7/2006 | Aydar et al. |
| 2006/0167855 A1 | 7/2006 | Ishikawa et al. |
| 2006/0168022 A1 | 7/2006 | Levin et al. |
| 2006/0173838 A1 | 8/2006 | Garg et al. |
| 2006/0173957 A1 | 8/2006 | Robinson et al. |
| 2006/0173963 A1 | 8/2006 | Roseway et al. |
| 2006/0184464 A1 | 8/2006 | Tseng et al. |
| 2006/0184997 A1 | 8/2006 | La Rotonda et al. |
| 2006/0187858 A1 | 8/2006 | Kenichi et al. |
| 2006/0190281 A1 | 8/2006 | Kott et al. |
| 2006/0190524 A1 | 8/2006 | Bethke et al. |
| 2006/0190536 A1 | 8/2006 | Strong et al. |
| 2006/0195441 A1 | 8/2006 | Julia et al. |
| 2006/0195462 A1 | 8/2006 | Rogers |
| 2006/0200434 A1 | 9/2006 | Flinn et al. |
| 2006/0200435 A1 | 9/2006 | Flinn et al. |
| 2006/0209727 A1 | 9/2006 | Jennings, III et al. |
| 2006/0218153 A1 | 9/2006 | Voon et al. |
| 2006/0218225 A1 | 9/2006 | Hee Voon et al. |
| 2006/0218577 A1 | 9/2006 | Goodman et al. |
| 2006/0242581 A1 | 10/2006 | Manion et al. |
| 2006/0248458 A1 | 11/2006 | Li |
| 2006/0248573 A1 | 11/2006 | Pannu et al. |
| 2006/0259733 A1 | 11/2006 | Yamazaki et al. |
| 2006/0267940 A1 | 11/2006 | Groom et al. |
| 2006/0272015 A1 | 11/2006 | Frank et al. |
| 2006/0288041 A1 | 12/2006 | Plastina et al. |
| 2007/0028000 A1 | 2/2007 | Ebbesen et al. |
| 2007/0179945 A1 | 8/2007 | Marston et al. |
| 2007/0192294 A1 | 8/2007 | Ramer et al. |
| 2007/0192588 A1 | 8/2007 | Roskind et al. |
| 2007/0233828 A1 | 10/2007 | Gilbert |
| 2008/0016081 A1 | 1/2008 | MacMillan et al. |
| 2008/0059992 A1 | 3/2008 | Amidon et al. |
| 2008/0062945 A1 | 3/2008 | Ahuja et al. |
| 2008/0086759 A1* | 4/2008 | Colson .............................. 726/2 |
| 2009/0030943 A1* | 1/2009 | Kall ........................... 707/104.1 |
| 2012/0066167 A1* | 3/2012 | Fokoue et al. ................... 706/52 |

FOREIGN PATENT DOCUMENTS

| | | | |
|---|---|---|---|
| EP | 1675060 A1 | 6/2006 | |
| WO | 2005111760 A1 | 11/2005 | |
| WO | 2006036165 A2 | 4/2006 | |
| WO | 2006041425 A2 | 4/2006 | |

OTHER PUBLICATIONS

Golbeck, J., "Papers and Talks—Trust in Web-Based Social Networks," MindSwap.org, accessed Aug. 7, 2007, 9 pages, http://trust.mindswap.org/papers.shtml.

Kagal, L., et al., "Developing Secure Agent Systems Using Delegation Based Trust Management," Security of Mobile Multi-Agent Systems Workshop, Published: 2002, 8 pages.

McGuinness, Di., et al., "OWL Web Ontology Language Overview: W3C Recommendation," W3C, Feb. 10, 2004, 19 pages.

Newman, M.E.J., "The Mathematics of Networks", Center for the Study of Complex Systems—University of Michigan, 12 pages.

No Author,"Architecture of Windows Media Rights Manager," Microsoft Corporation, May 2004, accessed Oct. 25, 2006, 5 pages, http://www.microsoft.com/windows/windowsmedia/howto/articles/drmarchitecture.aspx.

No Author, "Dijkstra's algorithm," Wikipedia, the free encyclopedia, accessed Apr. 10, 2008, 4 pages, http://en.wikipedia.org/wiki/Dijkstra's_algorithm.

No Author, "Friendster—Home", Friendster.com, accessed Feb. 8, 2007, 2 pages, http://www.friendster.com.

No Author, "Huminity—Social Networking, Chat Software, Create Personal Free Blogs and My Group Blogs!", accessed Feb. 8, 2007, 1 page, http://www.huminity.com.

No Author, "ICQ.com—community, people search and messaging service," ICQ, accessed Jan. 16, 2008, 2 pages, http://www.icq.com.

No Author, "myspace.com—a place for friends", MySpace, accessed Apr. 10, 2008, 2 pages, http://www.myspace.com.

No Author, "News—Gaim 1.5.0," SourceForge.net, Feb. 2, 2007, Accessed Sep. 6, 2007, 3 pages, http://www.gaim.sourceforge.net.

No Author, "Pidgin: Home," Pidgin, accessed Jul. 13, 2007, 1 page, http://pidgin.im/pidgin/home/.

No Author, "Semantic Web Trust and Security Resource Guide," Freie Universit•t Berlin, accessed Aug. 7, 2007, 13 pages, http://sites.wiwiss.fu-berlin.de/suhl/bizer/SWTSGuide/.

No Author, "Welcome to Facebook!", Facebook, accessed Apr. 10, 2008, 1 page, http://www.facebook.com.

No Author, "The Friend of a Friend (FOAF) Project," FOAF Project, accessed Apr. 26, 2007, 1 page, www.foaf-project.org.

Pretschner, A., et al., "Ontology Based Personalized Search," Proceedings of the 11th IEEE International Conference on Tools with Artificial Intelligence, Nov. 1999, 8 pages.

Sack, W., "Discourse Diagrams: Interface Design for Very Large-Scale Conversations," Proceedings of the 33rd Hawaii International Conference on System Sciences, 2000, 10 pages.

Smith, M.A., et al., "Visualization Components for Persistent Conversations," Proceedings of the SIGCHI Conference on Human Factors in Computing Systems, 2001, 8 pages.

Srinivasan, T., et al., "OPSHNN: Ontology based Personalized Searching Using Hierarchical Neural Networks Evidence Combination," Proceedings of the Sixth IEEE International Conference on Computer and Information Technology, 2006, 6 pages.

Vitiello Jr., E., "trust—A module for defining trust relationships in FOAF," Jul. 22, 2002, updated Nov. 19, 2002, 2 pages, http://www.perceive.net/schemas/20021119/trust/default.htm.

Author Unknown, "Centrality", Wikipedia—the free encyclopedia, Updated Sep. 14, 2007, Retrieved on Sep. 19, 2007, http://en.wikipedia.org/wiki/Centrality, 3 pages.

Author Unknown, "Eigenvector Centrality", Wikipedia—the free encyclopedia, Updated Sep. 14, 2007, Retrieved on Sep. 19, 2007, http://ermikipedia.org/wiki/Eigenvector_Centrality, 3 pages.

Yang, B., et al., "Designing a Super-Peer Network," 19th International Conference on Data Engineering, 2003, 15 pages.

Loo, B.T., et al., "The Case for a Hybrid P2P Search Infrastructure", IPTPS 2004, Feb. 26, 2004, 29 pages, http://www.cs.berkeley.edu/~boonloo/research/pier/casehybrid_iptps.ppt.

International Search Report for PCT/US07/77047, mailed Jul. 21, 2008, 9 pages.

International Preliminary Report on Patentability for PCT/US2007/077047, mailed Apr. 9, 2009, 5 pages.

First Office Action for Chinese Patent Application No. 200780043475.7, mailed Dec. 21, 2010, 44 pages.

Second Office Action for Chinese Patent Application No. 200780043475.7, mailed Jan. 29, 2012, 18 pages.

Non-Final Office Action for U.S. Appl. No. 11/636,910, mailed Apr. 9, 2010, 14 pages.

Notice of Allowance for U.S. Appl. No. 11/636,910, mailed Oct. 5, 2010, 9 pages.

Non-Final Office Action for U.S. Appl. No. 13/008,535, mailed Oct. 20, 2011, 39 pages.

Final Office Action for U.S. Appl. No. 13/008,535, mailed Jan. 24, 2012, 15 pages.

Notice of Allowance for U.S. Appl. No. 13/008,535, mailed Apr. 6, 2012, 44 pages.

Notice of Allowability for U.S. Appl. No. 13/008,535, mailed Aug. 2, 2012, 8 pages.

* cited by examiner

SYSTEM AND METHOD FOR SOCIAL NETWORK TRUST ASSESSMENT

CROSS-REFERENCE TO RELATED APPLICATION

The present application is a continuation of U.S. Ser. No. 13/008,535, filed on Jan. 18, 2011, now U.S. Pat. No. 8,276,207, which issued on Sep. 25, 2012, which was a continuation of U.S. Ser. No. 11/636,910, file on Dec. 11, 2006, now U.S. Pat. No. 7,886,334, which issued on Feb. 8, 2011, the disclosures of both applications are hereby incorporated by reference in its entirety; therefore, the present application claims priority to both the application and patent.

FIELD OF THE INVENTION

The present invention relates generally to computer networks, including systems and methods and systems for determining trust between users of devices in such networks.

BACKGROUND OF THE INVENTION

Determining whether or not a user can be trusted remains a persistent problem in computer-related fields. For example, a first user may wish to limit access to content, computer, network, or other resources on the basis of how much the first user trusts potential accessing users. However, the first user may not have the time or resources to personally evaluate or determine the degree of trustworthiness with regard to other users, especially with regard to content or other resources that are made widely available.

Presently-existing systems attempt to provide information to guide user trust assessment. For instance, many systems use community-wide ratings of users such as "reputation" and "karma." Other systems rely on references, referrals, recommendations, and/or other descriptive indicators to allow users to categorize and evaluate other users.

Data obtained from analyzing social networks may provide another avenue for determining whether or not a user can be trusted. Generally speaking, a "social network" refers to a group of persons or other entities ("members") linked to one another through one or more types of social connections. Social networks are also commonly referred to as "friend-of-a-friend" networks, although social networks may of course include or consist entirely of entities linked by social connections other than friendship. For example, a social network can include members linked to one another by connections including common friendship, place or field of employment, place of education, place of residence, membership in a club or other group, or common hobbies or topical interests. Many social networking systems attempt to provide computer-based tools for maintaining, enhancing, and creating social networks.

For example, social networking web sites provide users with web space to create a profile and link to various other users designated as "friends." See, for example, http://www.myspace.com, http://www.facebook.com, and http://www.friendster.com. Users of such sites can post messages and other content to web pages accessible to various parties of their choosing (for example, to "friends only" or to the public at large). Social networking sites may also utilize instant messaging and online chat rooms that allow for near-instantaneous communication between users.

Some presently-existing social network systems implement trust evaluation based on degree of separation. Other presently-existing systems may use combinations of social network analysis and recommendations or reputation functionality.

Computer based systems may provide for some degree of automated user verification, as well. For example, many online services, such as those providing web-based e-mail functionality, allow a user to verify his or her identity in the event of a lost password by answering one or more verification questions.

A need remains for improved methods and systems for trust assessment that may be wholly or partially automated.

SUMMARY OF THE INVENTION

Objects and advantages of the present invention will be apparent to one of skill in the art upon careful review of the disclosure. Such objects and advantages include providing systems and methods for semi- or fully-automated trust assessment.

Embodiments of the presently-disclosed systems and methods for trust assessment allow for a first user's trust level regarding a second user to be determined on a basis specific to both the first and second users, rather than solely on external factors or metrics. The trust assessments are specific for a number of reasons that will be apparent upon further review of the disclosure. Such reasons include the fact that, in the presently-disclosed technology, the trust assessments are based (at least in part) on determining the second user's knowledge about the first user. Additional reasons include the fact that, in the presently-disclosed technology, the trust assessments are based (at least in part) on the second user's own responses, and not solely upon information about the second user provided by third parties.

The remainder of this disclosure refers to various "users." In this disclosure, a "requesting user" is a user (or other party) that wishes to determine the level of trust that a "target user" holds with regard to a "second user." In many of the examples discussed herein, the various users are individuals each associated with one or more computing devices. However, the methods and systems disclosed herein are applicable to situations other than those solely involving individuals, and so one of skill in the art should appreciate that a "user" may in fact comprise other entities, including groups of individuals.

A method of determining trust can include receiving a request for a target user's trust level with regard to a second user and accessing trust assessment data from one or more knowledge bases. The request may be received from any entity, including the second user, an entity acting on behalf of the second user, and a third party entity or user interested in the relationship between the target user and the second user. The trust assessment data may include personal data and/or other data specific to the target user, and may be partitioned or divided into categories corresponding to various levels of trust.

Using the trust assessment data, the second user is interrogated with one or more trust assessment questions or prompts. Based on the interrogation results, trust assessment result data is generated and stored in a computer-readable form. The trust assessment data may include a trust level that is computed based on response data received from the second user while the second user is interrogated.

For example, a trust level may be computed by determining if the responses from the second user match stored items about the target user, thereby proving (or disproving) that the second user knows information about the target user. Based on the second user's responses, the second user can be assigned a trust level corresponding to the level associated with the known information. For example, if each stored item is associated with a trust level, the second user may be assigned the highest trust level assigned to any of the stored items that are matched by the second user's responses. In some embodiments, the trust level associated with the second user may be adjusted, and so assigned trust levels will not always directly correspond to the trust levels in the knowledge base on a one-to-one basis. Furthermore, the second user's responses may be evaluated in multiple ways, including whether their responses are correct/incorrect, but also using more sophisticated analysis and/or matching.

For example, the second user may be prompted to answer a plurality of questions. Each question, for instance, may be associated with a number of points that correspond to a trust level. Alternatively, each answer may provide credit for a certain number of points. The second user's responses to the questions may be scored, in any suitable fashion, for example, using neural networks and/or expert systems. Evaluating the responses to the questions may include giving partial credit depending upon the degree of correctness in the second user's answer(s). The resulting scores may be used in a calculation to determine a trust level. For example, the scores may be summed, averaged, or otherwise manipulated to determine an aggregate score, which is then cross-referenced to a trust level.

In some embodiments, trust assessment sessions may proceed based on information other than data about the target user. For example, at least some trust assessment questions may be based on stored items about a pseudo-target user. The pseudo-target user may comprise a member of the target user's social network, and may be directly designated by the target user. Alternatively, one or more pseudo-target users may be chosen automatically by the system based on user preferences and specifications.

For instance, if a second user cannot correctly identify any information about a target user, the trust assessment process may change so as to include questions about a pseudo-target user drawn from one or more knowledge bases associated with the pseudo-target user. The scoring and/or the trust assessment process may be altered based on the relationship between the target user and the pseudo-target user. For instance, the calculated trust level of the second user with regard to the pseudo-target user may be adjusted, for purposes of the target user, based at least in part on the relationship between the target user and pseudo target user as defined in the data from the social network system.

The trust assessment question(s) or prompt(s) may be generated at the time the request is made. Alternatively or additionally, the trust assessment question(s) or prompts may be specified beforehand and stored in the knowledge base. The knowledge base may contain multiple questions or variants thereof, and interrogating the second user can include presenting all or some of the questions.

The trust assessment session may proceed down multiple alternative paths based on user preferences. For example, multiple knowledge bases may be utilized for generating questions(s) or prompt(s) and determining results. The particular knowledge base that is used may be based on one or more factors, including, for example, classification of the second user into one or more groups, the second user's progress in the trust assessment session, and trust assessment data and metadata regarding prior interactions between the second user and the trust assessment system. Users may be classified by any suitable parameters or combinations of parameters, including, for example, on the basis of the resource or content the second user wishes to access, the second user's relationship to the target user, results of prior trust assessments of the second user by other users, and other prior trust assessment activity by the second user.

For example, certain second users may be subjected to one type of trust assessment session with different questions and requirements for achieving trust levels, while certain other second users are subjected to another type of trust assessment session. Similarly, the knowledge base used and/or trust assessment session progress may be changed, for example, for a second user based on the second user's responses and other interaction (question response time, trust level progression, etc.) with the trust assessment system.

The method can further comprise interaction with the target user. For example, in some embodiments, the method includes sending one or more messages to the target user about the trust assessment session. The target user may be provided with the trust assessment result data including the computed trust level. The method may further include modifying the trust level based on feedback from the target user. For instance, the target user may recognize the second user upon receipt of the notification message and adjust the trust level upward or downward from the computed level. In other embodiments, the target user may steer or otherwise direct the trust assessment session(s) while such session(s) are in progress. For example, the target user may specify a certain line of questioning and/or knowledge base to be used in an ongoing trust assessment session.

The trust assessment request may include at least one result address and one or more exit criteria. The exit criteria may specify conditions or results that should be met or otherwise considered during the trust assessment session. For example, the exit criteria may specify a minimal trust level. Once the computed trust level for the second user meets or exceeds the minimal trust level, the session may be discontinued. As a further example, the exit criteria may specify a time limit for responses to interrogation. For instance, if the second user does not answer one or more questions within a specified time limit and/or reach a certain trust level within a specified time limit, the trust assessment session may be discontinued, or the resulting trust level and/or trust assessment result data may be modified to note the occurrence of the time-out.

A trust assessment system can include at least one knowledge base stored in one or more computer readable media, with each knowledge base including a plurality of data items associated with a particular target user, and each data item in each knowledge base associated with a trust level. A trust assessment system may also include at least one computing device including a network interface, the at least one computing device configured to access one or more computer-readable media and execute instructions directing the computing device to perform actions including: receive a trust assessment request, determine, from data included in the trust assessment request, a specified target user and a second user, access a plurality of data items associated with the specified target user, each data item associated with a trust level, interrogate the second user using the accessed data items, receive response data from the second user, determine the extent to which the second user's response data matches at least one data item, and, based on the interrogation results, assign a trust level to the second user based on the trust level associated with the at least one matched data item.

The trust assessment system may comprise a single server or multiple servers. Trust assessment system functionality may be partially or entirely distributed across a network, as well.

A method of assembling a trust assessment knowledge base can include collecting personal information regarding a target user. The information may be collected by prompting the target user and/or by analyzing metadata (and other data) associated with the user. For example, information about a target user may be collected by accessing data stored by one or more social networking systems. The data may be used to determine relationships between the target user and other users and other information about the target user to define information to be included in the knowledge base. For example, collected social network data may include information such as relationship definitions, calculations or other parameters describing relationships (e.g., degrees of separation), relationship history, communication history and frequency, and content sharing history and frequency. Other social network data and metadata may be used, as well.

After or while information is collected, the information may be partitioned into a plurality of trust levels. For example, the target user may be prompted to assign trust levels to the information. Partitioning can include sorting the information into default trust levels based on classification of similar information by users other than the target user. The target user may then accept or alter the default trust levels. One of skill in the art will recognize that "partitioning" refers to logical partitioning and not necessarily physical partitioning:

Assembling the knowledge base can further include associating one or more trust assessment questions with the personal information. The questions can be stored in the knowledge base or in any other suitable form.

Once the knowledge base has been assembled and partitioned into levels, it can be stored in any suitable computer-readable medium. In some embodiments, the data may be distributed to multiple networked computing devices. Each device may maintain all or part of the knowledge base. For example, one device may maintain a first part of the knowledge base while another part of the knowledge base is maintained by another device. The parts of the knowledge base may be mutually exclusive, or may partially or fully overlap. For instance, the portion of the knowledge base containing high-trust-level information may kept at one or more computing devices associated with the target user, while less-sensitive portions of the knowledge base are distributed to other computing devices.

In additional embodiments, a target user's knowledge base may be distributed across one or more social networks including the target user. In some embodiments, the distribution of the knowledge base may be based on the target user's trust level for the various members of the social network receiving the knowledge base. For example, highly-trusted members may be allowed to maintain portions of the knowledge base including high-trust-level data while less-trusted members maintain only low-trust-level data.

BRIEF DESCRIPTION OF THE SEVERAL VIEWS OF THE DRAWINGS

A full and enabling disclosure including the best mode of practicing the appended claims and directed to one of ordinary skill in the art is set forth more particularly in the remainder of the specification. The specification makes reference to the appended figures, in which:

Use of like reference numerals in different features is intended to illustrate like or analogous components.

DETAILED DESCRIPTION OF THE PREFERRED EMBODIMENTS

Figure 1:
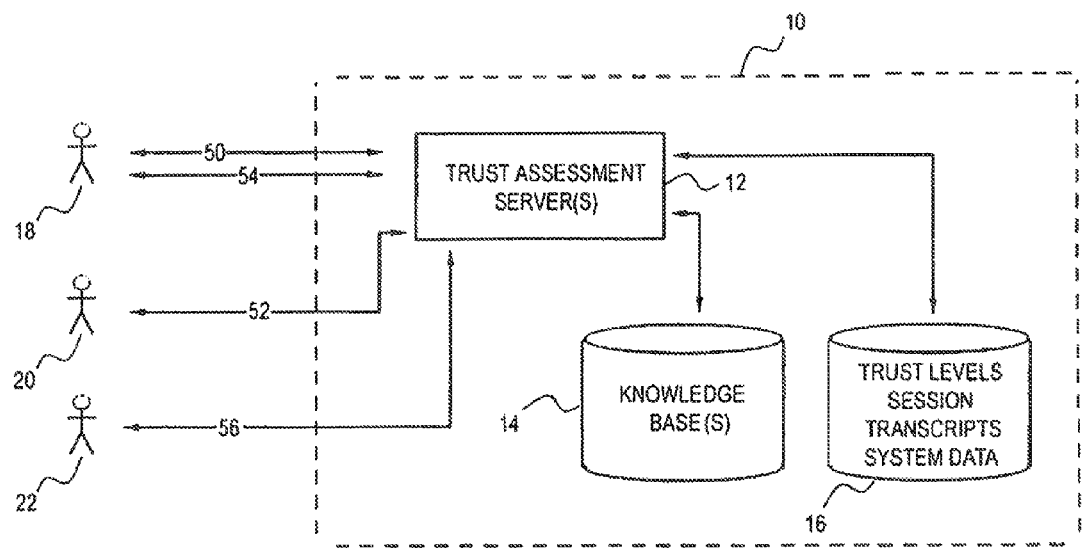
FIG. 1 is a diagram illustrating an example of interactions with an exemplary trust assessment system.

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The technology discussed herein makes reference to servers, databases, software applications, and other computer-based systems, as well as actions taken and information sent to and from such systems. One of ordinary skill in the art will recognize the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel. When data is obtained or accessed between a first and second computer system or component thereof, the actual data may travel between the systems directly or indirectly. For example, if a first computer accesses a file or data from a second computer, the access may involve one or more intermediary computers, proxies, and the like. The actual file or data may move between the computers, or one computer may provide a pointer or metafile that the second computer uses to access the actual data from a computer other than the first computer, for instance.

The present disclosure also makes reference to the relay of communicated data over a network such as the Internet. It should be appreciated that such network communications may also occur over alternative networks such as a dial-in network, a local area network (LAN), wide area network (WAN), public switched telephone network (PSTN), the Internet, intranet or Ethernet type networks and others over any combination of hard-wired or wireless communication links.

The various computer systems discussed herein are not limited to any particular hardware architecture or configuration. Any suitable programming, scripting, or other type of language or combinations of languages may be used to implement the teachings contained herein. Embodiments of the methods and systems set forth herein may be implemented by one or more general-purpose or customized computing devices accessing software instructions rendered in a computer-readable form. Embodiments of the methods and systems set forth herein may also be implemented by hard-wired logic or other circuitry, including, but not limited to application-specific circuits. Of course, combinations of computer-executed software and hard-wired logic may be suitable, as well.

Embodiments of the methods disclosed herein may be executed by one or more suitable computing devices. Such devices may access one or more computer-readable media that embody computer-readable instructions which, when executed by at least one computer, cause the at least one computer to implement one or more embodiments of the methods disclosed herein. Furthermore, components of the presently-disclosed technology, such as knowledge bases and data stores, may be implemented using one or more computer-readable media. Any suitable computer-readable medium or media may be used, including diskettes, drives, and other magnetic-based storage media, optical storage media, including disks (including CD-ROMS, DVD-ROMS, and variants thereof), flash, RAM, ROM, and other memory devices, and the like.

The present disclosure provides several examples of trust assessment with regard to allowing access to content, such as digital photos. However, one of ordinary skill in the art will understand that the principles and teachings contained herein are applicable not only to content sharing, but are also applicable to any other suitable situation in which access to a resource involves a networked computer.

FIG. 1 is a diagram illustrating a plurality of users 18, 20, and 22 and their interactions with an exemplary trust assessment system 10. In this example, trust assessment system 10 includes one or more trust assessment server(s) 12 which may comprise any suitable computing device or combinations of devices. Server(s) 12 have access to computer-readable data stores including one or more knowledge bases 14 and one or more stores 16. Knowledge base 14 comprises a plurality of stored data items regarding a target user, with the data items partitioned or otherwise associated with various levels or degrees of trust. Store 16 includes additional data used in the trust assessment process and user support, including scoring algorithms, trust assessment session transcripts, user classification and interrogation routine handling parameters, access and security parameters, data for interfacing with other systems, and other logs and trust assessment session and system metadata.

Knowledge base 14 and store 16 comprise any suitable computer-readable medium or media, and, in some embodiments, all data is combined and stored in knowledge base 14. As will be discussed in detail below, the trust assessment system 10 may be distributed across multiple computing devices or may comprise a single server. Therefore, knowledge base 14 and store 16 may be located in any location so long as both are accessible to the server(s) 12. Of course, one of skill in the art will recognize that server(s) 12 have access to additional resources including operating systems, system memory, network interfaces, and any other components needed to implement the computer-based systems and methods of the presently-disclosed technology.

Requesting user 18 represents any individual, group, system, or other entity that wishes to obtain information about the relationship between target user 20 and second user 22. Trust assessment system 10 acts in response to trust assessment request 50 and operates to provide requesting user 18 with trust assessment result data 54, the result data including one or more descriptions of the level of trust that target user 20 holds with regard to second user 22.

The level of trust may be determined by trust assessment system 10 via interrogation prompts and responses 56 directed to second user 22 that provide system 10 with a basis for determining the extent of second user 22's knowledge about target user 20. Data about target user 20 stored in knowledge base 14 is partitioned into various levels of trust. By comparing second user 22's knowledge to the data stored in the knowledge base, the trust assessment system can determine a trust level by, for example, matching the trust level for second user 22 to the trust level of the data in the knowledge base. For example, a particular target user 20 may classify items of personal information stored in knowledge base 14 as set forth in the table below:

TABLE 1

Exemplary Data Items from Knowledge Base and Associated Trust Level

| Information about User 20 | Associated Trust Level |
|---|---|
| birthplace | Low |
| pet's name | Medium |
| location and date of marriage | High |

Trust assessment system 10 may prompt a second user 22 with various questions or other directions to provide information about target user 20. If second user 22 is able to name only the target user's birthplace, the trust level assigned to the second user will be "low." If second user 22 can name the target user's pet's name, the assigned trust level will be "medium," while if second user 22 knows the location and date of target user 20's marriage, the assigned trust level will be "high." As will be discussed below, additional considerations may also impact the final trust level that is assigned to second user 22, and so the trust levels will not always necessarily exactly coincide. Furthermore, one of skill in the art will appreciate that any type and combination of trust level designators may be used, including, but not limited to, textual classifiers and numerical levels.

As is the case with requesting user 18, target user 20 and second user 22 may each comprise an individual, group, or other entity. Furthermore, the respective roles of the users may overlap in certain circumstances—for example, either of target user 20 or second user 22 may also have reason to inquire as to target user 20's trust level of second user 22 and thereby function as the "requesting user." For example, requesting user 18 could be an entity interested in whether a target group trusts an individual or another group. User 18 may comprise a group or another entity. As will be discussed below, user 18 may alternatively comprise a computer system controlling access to content or other network resources.

Requesting user 18 provides one or more trust assessment requests 50 to trust assessment system 10. A trust assessment request includes at least a specification of a target user and a second user, but may include multiple target users and/or multiple second users. Furthermore, a trust assessment request may contain additional information. For example, the trust assessment request may further specify exit criteria that must be met during the trust assessment session. Depending upon the exit criteria, the trust assessment result data 54 and/or the interrogation process may be altered. Request 50 may further include network addresses, such as uniform resource locators (URLs), IP addresses, e-mail addresses, and/or other designators. In one embodiment, request 50 includes a result URL and a completion URL, with the result URL directing where trust assessment system 10 sends the trust assessment result data and the completion URL specifying where trust assessment system 10 sends second user 22 after trust assessment is complete. Although FIG. 1 depicts trust assessment result data 54 returning only to requesting user 18, the data may be returned to other users, systems, or entities in addition to or other than requesting user 18.

FIG. 1 also illustrates connection 52 between trust assessment system 10 and target user 20. In some embodiments, trust assessment system 10 may be configured to provide one or more messages or notifications to target user 20 about the trust assessment session. For example, target user 20 may receive an email, instant message, or other notification of the trust assessment session progress and the identity of second user 22. Target user 20 may be provided with the trust level that is determined by trust assessment system 10 and may adjust the assigned trust level upward or downward. Trust assessment system 10 may also provide functionality for target user 20 to log in to the system or otherwise view and adjust determined trust levels for various second users. For example, if a target user 20 determines a second user 22 is untrustworthy, the target user 20 may log in to the system and manually adjust second user 22's trust level downward.

Connection 52 may also represent feedback provided to a target user 20 while the interrogation of second user 22 is in progress. For example, the target user may specify one or more events that trigger target user 20's involvement in the trust assessment process as it occurs. The degree of involvement can vary from observation to direct interaction in the trust assessment process. For example, the target user may be able to suspend the trust assessment session and contact the second user directly, if desired. Alternatively, the target user may be able to guide the selection of questions, scoring of questions, calculation of trust level, and other aspects of the interrogation and overall trust assessment process.

Observation/guidance of trust assessments may be carried out via messages exchanged between the target user and trust assessment system over connection 52, such as IM, SMS, and the like. Alternatively or additionally, connection 52 may represent one or more other connections between the target user and trust assessment system. For example, server(s) 12 (and/or other devices associated with the trust assessment system) may provide login functionality whereby a target user can access web pages or other renderings of one or more trust assessment sessions in progress. For example, the page may show trust assessment transcripts, question scores/and or trust levels, and options for tuning the trust assessment process and results.

Figure 2:
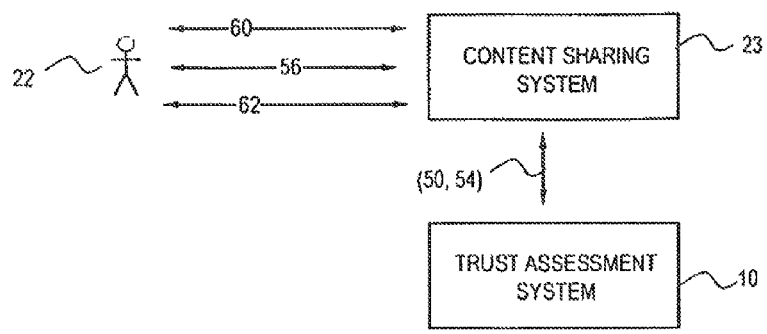
FIG. 2 is a diagram illustrating a second example of interactions with a trust assessment system.

FIG. 2 illustrates an exemplary system that utilizes trust assessment system 10 in the context of content distribution. Second user 22 may wish to use content sharing system 23 to access content produced by or otherwise under the control of target user 20 (not shown). For example, content sharing system 23 may comprise a peer-to-peer (P2P), centralized, hybrid P2P, or other system for sharing digital assets, including, for example, user photographs. Target user 20 may have provided digital photographs for sharing via content sharing system 23 subject to controls or limitations on distribution based on levels of trust. Accordingly, when content sharing system 23 receives second user 22's request 60 for content, content sharing system 23 acts as a requesting user and sends a trust assessment request 50 to trust assessment system 10. Trust assessment system 10 may be an entirely separate service, but may alternatively be partially or wholly incorporated into the content sharing system 23. Second user 22 is interrogated at 56 by prompts and/or questions in a manner specified by target user 20. In this example, the interrogation is carried out by trust assessment system 10 via content sharing system 23. For example, content sharing system 23 may act as a proxy for trust assessment system 10 in all or some parts of the trust assessment session. Alternatively, trust assessment system 10 may connect directly to second user 22 for all or part of the interrogation session.

In any event, trust assessment system 10 determines target user 20's level of trust with regard to second user 22 and provides trust assessment result data 54 to content sharing system 23. Based on the trust assessment result data 54, content sharing system 23 may then provide content to second user 22 as shown at 62. If the trust assessment result data indicates that second user 22 is not sufficiently trusted by target user 20, no content may be provided, for example. The particular handling and actions taken upon receipt of trust assessment result data will vary according to the system or other recipient of such data, and examples included herein that detail actions taken based on trust assessment result data are not intended to be limiting.

Exemplary trust assessment sessions and additional activities performed in an exemplary trust assessment system will now be discussed using FIGS. 1-2 in conjunction with the flowcharts of FIGS. 3-4.

Figure 3:
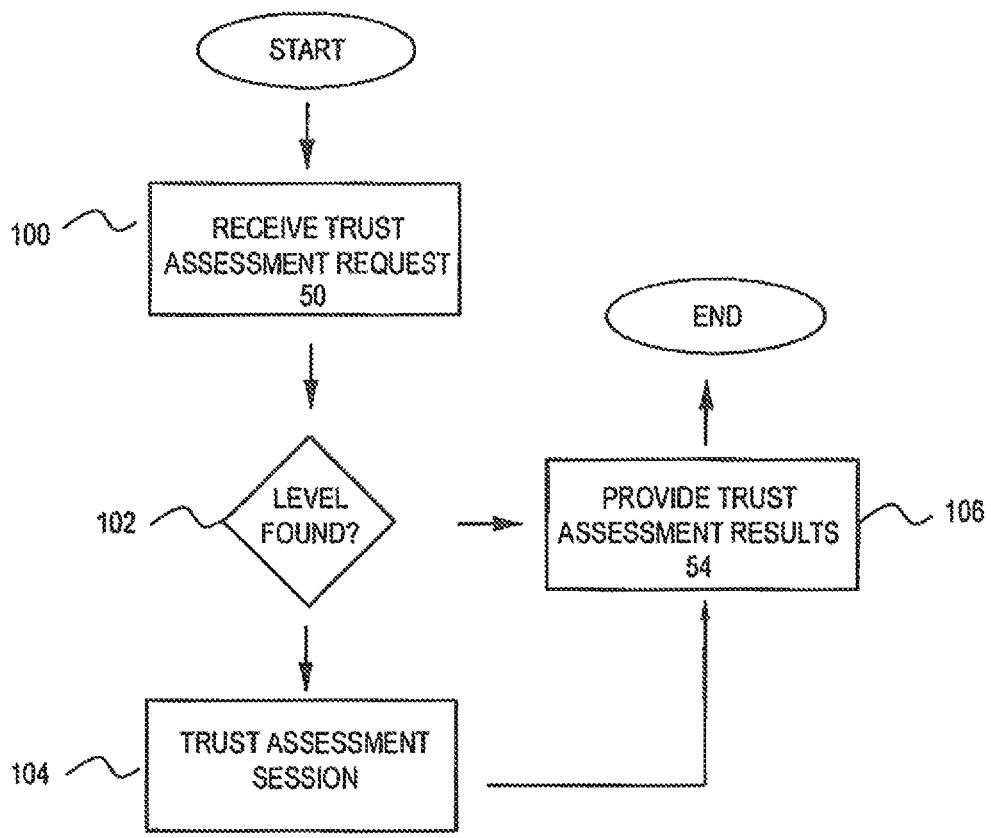
FIG. 3 is a flowchart illustrating exemplary steps performed by a trust assessment system.

FIG. 3 is a flowchart illustrating exemplary steps in an initial process carried out by a trust assessment system such as trust assessment system 10 upon receipt of a trust assessment request. Initially, at step 100, one or more trust assessment requests 50 are received by the trust assessment system. The trust assessment request preferably contains data identifying a target user 20 and a second user 22. The request may further include network addresses for providing trust assessment result data and/or data to be used in redirecting second user 22 after the trust assessment is completed. Furthermore, request 50 may also include various exit criteria or parameters that influence the trust assessment process, as will be discussed in detail below.

At step 102, based on the identification of second user 22, the system may first check to see if a trust assessment level or other data is already available with regard to target user 20's trust level of second user 22. Trust assessment result data from previous sessions may be stored by trust assessment system 10, which may advantageously avoid subjecting second user 22 to repeated trust assessment sessions. However, previously-determined trust assessment results may be unsuitable for a variety of reasons. For example, a prior trust assessment may be out of date or applicable in one context but not another. Accordingly, at step 102, the trust assessment system validates any previously-available trust assessment data for the user 20/user 22 pair. If such data is available and suitable for use, then at step 106 the data may be provided as trust assessment result data 54.

Stored records of past trust assessment sessions may be advantageous in situations in which a second user has previously undergone trust assessment. For example, a second user 22 may have undergone a trust assessment session with regard to a target user 20 and achieved a certain level of trust adequate for prior interaction. However, sometime after that, second user 22 may undertake activity that requires a higher trust level. Trust assessment system 10 may include support for such situations by allowing second user 22 to resume a previous trust assessment session or otherwise receive "credit" for a previously-achieved trust level by skipping ahead in the trust assessment process. Trust assessment system 10 may maintain audit records, trust assessment session transcripts, and other data in addition to stored records of trust levels and use any or all of such data to determine the starting point for second user 22. In some embodiments, when determining a target user's trust level of a second user, the trust assessment system may rely at least in part on prior trust assessment results from other target users with regard to that second user. Examples of such embodiments will be discussed later in this disclosure.

The second user may be identified to the trust assessment system in any suitable fashion. For example, the trust assessment system may support login or other identification schemes for second users. Alternatively, session identifiers such as cookies may be set so that the trust assessment system can "recognize" a second user for trust assessment purposes without necessarily identifying the second user.

Validation parameters for validating prior trust assessment results may be set by target user 20 (or other administrative users) in any suitable fashion. For example, the trust assessment system 10 may provide configuration settings that allow target user 20 to specify time periods during which results will remain valid, and/or to specify how to handle partial trust assessment session results. Alternatively, target user 20 may specify result validation parameters as part of interacting with systems such as content sharing system 23 that utilize trust assessment system 10. For example, content sharing system 23 may be configurable such that parameters reflective of target user 20's preferences are included as part of trust assessment request 50 sent by content sharing system 23.

However, if a valid trust assessment level (or other data) is not found at step 102, then at step 104 a trust assessment session is initiated with second user 22. Based on the results of the trust assessment session, trust assessment result data 54 is then provided at step 106. Additionally, the newly-generated trust assessment result data may be stored and associated with second user 22 for possible use in later trust assessment situations.

Figure 4:
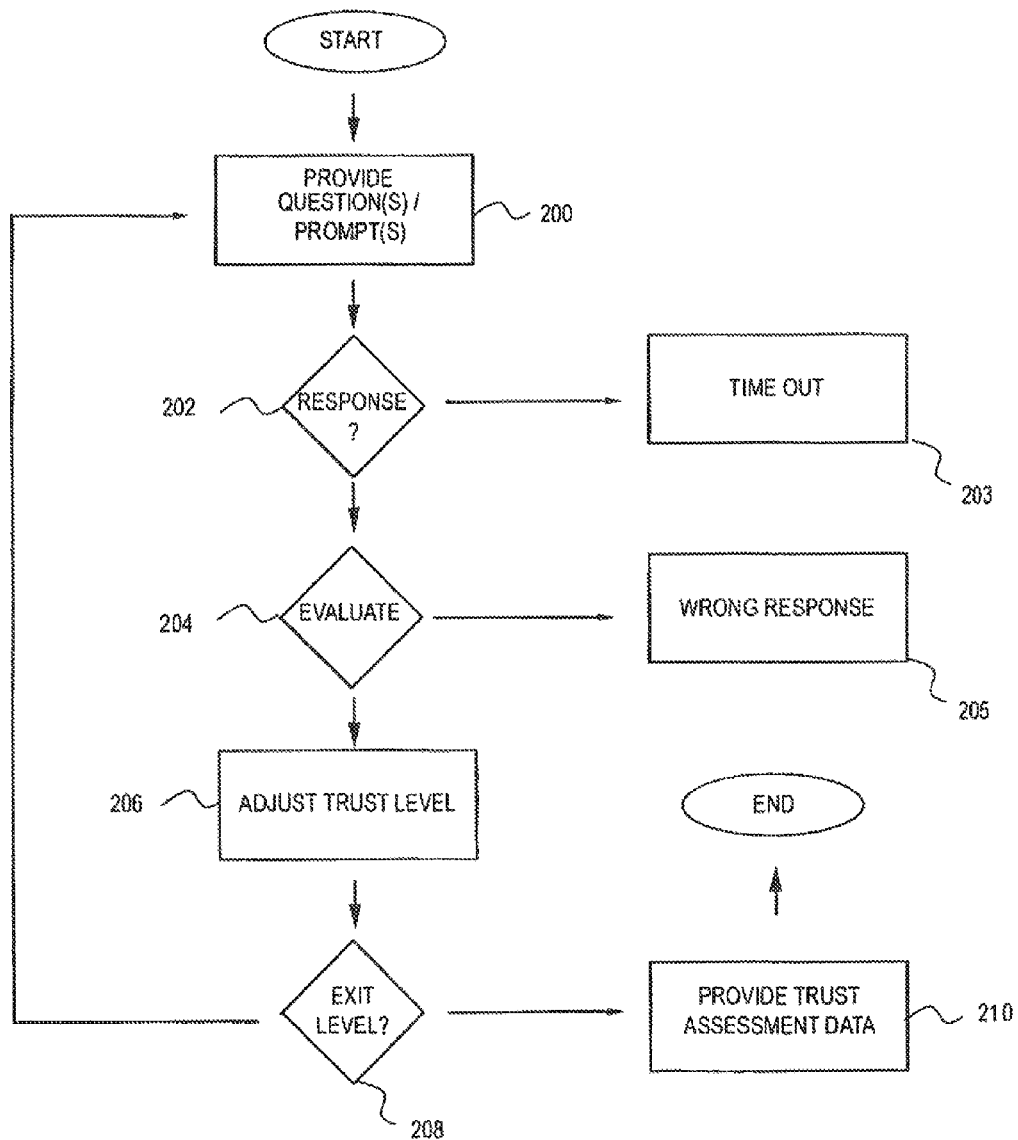
FIG. 4 is a flowchart illustrating exemplary steps performed by a trust assessment system in determining a trust level.

FIG. 4 is a flowchart showing exemplary steps in a trust assessment session. Trust assessment system 10 establishes a connection with second user 22 over a secure communication channel to begin interrogating second user 22. For example, trust assessment system 10 may be configured to interact with second user 22 through a secure HTTP session using a web browser. Of course, in alternative embodiments, any other types of communication channels could be used. At step 200, the trust assessment system provides one or more questions and/or prompts to second user 22, with the question(s) and/or prompt(s) associated with information about target user 20 stored in knowledge base 14. The initial question(s) and/or prompt(s) may be selected by assigning a baseline trust level to second user 22. In some circumstances, the baseline trust level may be zero or some other indicator for a second user who has no valid trust level at the beginning of the session. However, as discussed elsewhere in this disclosure, the trust assessment system may provide for users who have undergone previous trust assessment sessions to start out at another level, such as a previously-achieved level.

The number of question(s) or prompt(s) may be varied and any suitable type or format may be used. For example, the system may use multiple choice questions, true-or-false questions, fill-in-the-blank questions, matching questions, or combinations thereof. Alternatively or additionally, the trust assessment session may include a prompt and a text area instructing second user 22 to type or otherwise input whatever information second user 22 knows about target user 20. Multiple choice questions may be specified in any form, including those where there is one correct answer, no correct answer (i.e. the "right" answer is "none of the above") and those in which there are multiple correct answers.

The order in which questions are presented may be varied. In some embodiments, the order of questioning is based on the trust level of the associated information, for example, moving from lower trust levels to higher trust levels. Alternatively, the order of questioning may be randomized. Each trust level may have one or more questions, and depending upon target user preferences, all or some of the questions may be required before the second user can advance to another trust level. Additionally, each item of information may have several alternative question forms. In additional embodiments, the order in which questions are presented may be varied as part of event-based path selections as the interrogation proceeds, as will be discussed later in this disclosure.

At step 202, the system awaits a response from second user 22. As was mentioned above, request 50 may include one or more exit criteria including a time limit for responses. Use of a time limit is optional, but may be advantageous in certain contexts. Given enough time, an interrogated user could conceivably circumvent portions of the trust assessment process, for example by researching a target user via internet searches, user profiles, and other information services. Use of a time limit may prevent interrogated users such as second user 22 from accessing outside resources in order to answer questions about target users. For example, a target user or content sharing system employed by a target user may share content on the basis of user trust levels and specify that a requisite trust level must be reached and/or trust assessment questions are answered within time frame included in request 50. Alternatively or additionally, such a time limit or time limits may be specified by a target user during setup of trust assessment system 10.

If the time limit or limits are not met at step 202, then at step 203 the trust assessment session enters a time-out state. The end result of a time-out may include invalidating or discounting the value of the second user's answer(s) and/or ending the trust assessment session entirely.

Assuming a response is received in time, the response is evaluated at step 204 by comparing the second user 22's response data to the knowledge base data about target user 20. For example, second user 22's response may be checked against the knowledge base to determine whether or not it is appropriate to the question that was presented. The required degree of precision may be varied according to the target user's preferences and the question or prompt type. For example, the trust assessment system may require an exact match for multiple choice or true-or-false question types, but may allow for "close" answers to fill-in-the-blank questions or freeform responses. Fill-in-the-blank answers, freeform response, and other response types may be evaluated using expert systems, for example, to determine how "correct" the responses are. At step 205, the system may address the consequences of an "incorrect" response. This may include adjusting the trust level, presenting a different question, or ending the trust assessment session entirely.

Based on the evaluation, at step 206 the trust level for second user 22 is adjusted to the appropriate level. The trust level for second user 22 may be set to an initial default level and adjusted upward (or downward) based on the evaluated responses. In the most basic embodiment, if second user 22's response matches information associated with a particular trust level, second user 22 is assigned the trust level associated with the matched information. However, variations and adjustments may be introduced, including averaging, weighing, or otherwise considering response results for multiple questions at the same trust level, response times, number of tries, and other factors. If second user 22 is unsuccessful in answering any trust assessment questions or does not complete the session, the assigned trust level may be "zero," "NULL," or some other appropriate indicator of a failed trust assessment. Although not discussed in detail herein, the system could support negative trust levels, for example, in the case of gross mismatches in answers.

Step 208 represents another alternative action which may be included in a trust assessment session utilizing exit criteria. Exit criteria included in request 50 may include a target trust level for the trust assessment session. For example, a target user 20 sharing content in system 23 may utilize a trust scale ranging from a minimum of (0) to a maximum of (V) and set a minimal trust level of (II) to access certain resources. In this case, target user 20 is not concerned whether a user has a trust level of (III), (IV), or (V), so long as the level is not (0) or (I). Accordingly, at step 208, the system checks to see if the specified minimal trust level has been met. In this example, the trust assessment question(s)/prompt(s) are presented on a level-by-level basis, and so if the minimal trust level has not been met, the process loops back to step 200. If the minimal trust level has been met or exceeded, however, the system progresses to step 210. Specifying an exit trust level is that the system avoids revealing trust questions at levels higher than required. Such a feature may be especially advantageous with regard to high-trust-level questions, where even the question may provide clues that could later be used to circumvent the system. The target trust level may comprise a minimum or even maximum level, range of levels, or any other suitable specification of conditions. Trust levels may be designated in any suitable manner, including alphanumeric levels, scores or ranges, grades, colors, descriptive identifiers, and so on.

Although presented in these examples as an iterative process, the trust assessment session may comprise other formats, as well. For example, questions pertaining to a plurality of different trust levels, or all questions for an entire session may be presented at once. As noted above, a freeform response may be prompted and analyzed in place of one or more questions for determining whether a user meets one or more levels of trust.

In some of the examples above, a specific trust level is associated with an item of information and, if the item of information is shown to be known to the second user, the second user is assigned the trust level. However, trust levels may be determined in other ways as well. For example, the trust assessment questions may be scored and the collective scores analyzed to determine the degree of trust. For example, the scores for each question may be added into a lump sum, with different trust levels specified as ranges (e.g. "low": 0-33; "medium": 34-66; "high": 66-100; "highest": 100 and above). Ranges may overlap, of course.

In embodiments utilizing aggregated (or otherwise-calculated) scores, each item of information about the target user can be associated with a particular number of points or other indicators of trust level. For example, some questions, such as high-trust-level questions, could be worth more points than others, such as low-trust-level questions. Additionally, the system may be configured such that scoring of questions could provide for partial credit. For instance, if a second user can specify some, but not all, of a target user's address correctly, the second user may receive partial credit for the question depending upon the accuracy of the answer. The system may score questions using artificial intelligence, such as neural networks and expert systems. As a further example, certain answer selections may be worth more points than others.

Trust assessment system 10 may provide as much or as little feedback as desired to second user 22 before, during, and after a trust assessment session. For example, in some embodiments, second user 22 is given no indication of either the required trust level to access a resource or the adequacy of his answers during the trust assessment process. In other embodiments, second user 22 may be provided an indication of the trust level required to access a resource and/or second user 22's current trust level (if any). Although second user 22 may be given feedback during the trust assessment process (such as indicators of progress in trust level or indicators of whether an answer is right, wrong, or close), such feedback could aid in circumventing the system through research and/or skilled guessing and accordingly may not be preferable in some circumstances.

Once a trust level has been determined, the trust level can be included in trust assessment result data that is provided at step 210 in accordance with the request, for example, by providing the data to a specified computing device. The trust assessment data may further include additional information such as trust assessment session metadata and/or responses to any other inquiries included with the trust assessment requests.

FIG. 1 illustrates an exemplary trust assessment system 10 comprising one or more servers 12 with access to data stores including one or more knowledge bases 14 along with additional store(s) 16 including trust level identifiers, system information, and session transcripts. One of skill in the art will appreciate that the physical and logical arrangement of data created, stored, and otherwise used by trust assessment system 10 may be varied. For example, all data used by the system may be stored in a single combined database that is logically divided into multiple data stores, with one store for each user. However, regardless of the data storage layout or architecture, the data in each knowledge base 14 stores personal information about a potential target user, with each user's personal information separated into a plurality of trust levels by associating each item of information with a trust level identifier.

Knowledge base 14 may be assembled in a variety of ways. For example, trust assessment system 10 may assist each target user 20 in developing a knowledge base. Using, for instance, wizards, expert systems, or other AI (artificial intelligence) routines, trust assessment system 10 may prompt target user 20 for personal information across various common topics. For example, the system may provide questions such as: "What is your mother's maiden name?"; "What is your occupation?"; "What is your address?"; and so forth. Information provided in response to such common-topic prompts may be associated with default trust levels, for example, by analyzing the trust levels assigned to that information by other target users.

Alternatively, a target user may also provide personal information other than that associated with common topics. For instance, as part of the knowledge base assembly process, the target user may be given the option to enter in other user-generated information. Uncommon information may be especially useful for target users who wish to prevent educated guessing, for example, by specifying highly idiosyncratic information for use in very high trust level situations.

Another alternative information gathering strategy includes scanning metadata. The trust assessment system may utilize any source or combination of sources to obtain user, system, and/or content metadata. For example, trust assessment system 10 may access devices or computer system resources (such as user and system logs) associated with the target user to help identify topics and information related to the target user. The information scanned may include content play lists, web browsing history, call logs, IM or other communication transcripts, and the like. For example, if the trust assessment system is incorporated as a component in a content sharing system, the trust assessment system may monitor message traffic between users. The gathered/scanned information may be processed into any suitable format and presented to the target user for verification and alteration, if desired. For instance, if the metadata scan includes analyzing music playlists, the trust assessment system may determine a target user's supposed favorite song and present the system's "guess" for confirmation before inclusion in the knowledge base for the target user.

A still further source of knowledge base information may be found in a target user's social network. For example, a target user's knowledge base may comprise information about the target user's social network. Such information may be entered by the target user; alternatively or additionally, trust assessment system 10 may access a social network system to obtain relationship data and other information (such as profiles) about a target user's friends, relatives, co-workers, and other contacts. Of course, trust assessment system 10 may be implemented as a portion of a social network system as well and may be able to access such information without interfacing with an external resource. In any event, data about the target user's social network may provide a wealth of information, especially for automatically-generated questions.

For instance, trust assessment system 10 may automatically generate a trust assessment question such as "Who is [the target user]'s closest friend?", with the answer being determined based on analyzing degrees of separation, amount of content shared within the social network, frequency of communication, and so on. The particulars of how the trust assessment system defines such questions and defines the "correct" answers may be specified by the target user as rule sets, preferences, and other parameters. Continuing with the above example, a target user may specify to the system that the "closest" friend may be defined on the basis of content sharing or distance in a social network, and provide that multiple users may meet such criteria (i.e., more than one 'correct' answer).

After the information for inclusion in the knowledge base is obtained, it is then separated into various trust levels by target user 20. For example, information based on common topic prompts may be presented alongside "default" trust levels, with target user 20 being given the option to adjust the default level. Trust levels may be specified in any suitable manner, including textual identifiers and numerical scales. In some embodiments, if a target user opts to rearrange levels of certain information, trust assessment system 10 may automatically suggest moving related information.

An optional part of assembling a knowledge base regarding a target user can include generating and associating one or more trust assessment questions for use in the interrogation process. For example, for information provided by a target user that is not a common topic, the target user may be prompted to specify one or more questions that are then stored and associated with the information. Similarly, common topic information and information generated by trust assessment system scans of metadata may be associated with one or more questions. Target users may be presented with the proposed question(s) to allow or disallow use of particular questions or to edit, format, and otherwise alter question text. Target users may also specify their own versions of questions.

In some embodiments, all or some of the questions associated with a target user's information may be generated at the time of a trust assessment session. Similarly, the knowledge base may be updated based on scanned metadata at the time of a trust assessment session and/or at regular intervals to ensure that automatically-generated questions are based on the most current information about the target user, for example.

The trust assessment system may be customized to allow for different interrogation options depending on various parameters. For example, a target user may specify that certain knowledge base information is used to interrogate a first class of second users while different knowledge base information is used to interrogate another class of second users, and so forth. Additionally, the mode or progression of the interrogation and/or response requirements may be varied by user class and/or other parameters. As one of skill in the art will appreciate, second users may be divided into numerous different classes on the basis of numerous parameters and combinations thereof. Generally speaking, the various interrogation questions, paths, and other definitions of the interrogation process may be mapped to user classification parameters as part of the setup process with the target user. The mappings may be stored in any suitable location, including additional store 16 and associated with respective portions of knowledge base 14. Upon receipt of a trust assessment request including a specified parameter, trust assessment server(s) 12 may access the mappings to determine the manner in which the interrogation should proceed. Additionally, in some embodiments, trust assessment session metadata may be monitored by the system to adapt the trust assessment session as it is proceeding (for example, to change the interrogation based on context parameters as discussed below).

For example, a second user may be placed into a class based on the content or other resource that the second user is attempting to access. Certain questions may be keyed to the content—for instance, the target user may specify knowledge base data and interrogation questions so as to quiz second users about the content of camping trip photos or other information that would only be known to a person who participated in the camping trip. The target user can then appropriately configure the content sharing system with data identifying the subject photos as "camping photos." When a second user requests camping trip photos, the subject matter of the requested content may be relayed as a parameter (such as content="camping photos") with the trust assessment request or may be otherwise indicated to the trust assessment system. Based on the parameter, the trust assessment server(s) 12 can initiate an interrogation session specific to the "camping photos" knowledge base content.

As a further example, a second user may be placed into a class based on the second user's position and/or role in a social network relative to the target user. For instance, trust assessment server(s) 12 may interact with one or more social network systems to determine the relationship between the target user and the second user. For example, the target user may specify that second users within a certain degree of separation are subjected to a first line of questioning, while second users outside the specified degree of separation are subjected to a second, more detailed line of questioning. As another example, the social network data may be used to classify users. For example, the target user may specify that second users who are "co-workers" are subjected to different questioning than second users who are "family," and may specify a still different line of questioning for second users who are "friends." In such embodiments, trust assessment system 10 may include support for identifying second users, for example, by obtaining a user id (or other identity indicator) from the second user in order to access social network data.

As another example, a second user may be placed into a class based on the context of the second user's interrogation. For example, the interrogation process may vary based on time of day, network address of the second user and/or requesting user (if different), network condition (speed, etc.), mode of access, and the like. Rule sets may change based on determining where the second user is relative to the interrogation process, as well. For example, a target user may designate certain questions as leading to different paths depending upon the answer specified. Depending upon the path, the knowledge base used may change, question formats may change, and/or scoring and trust level determination may be altered.

As a further example, the target user may specify that certain questions are "gateway" questions that take precedence over any other progress in the trust assessment session. For example, a target user may specify multiple interrogation paths, such as prompting second users with an initial classification question (such as a selection prompt of "Are you a co-worker or family member?"). Based on the response, second users will then be interrogated based on a "work" knowledge base or a "family" knowledge base. However, regardless of progress within a particular path, the users must answer a particular question (or set of questions, etc.) to achieve a certain trust level.

As yet another example, a second user may be classified based on interrogation results. For instance, if a second user has repeatedly attempted to access a given resource but has failed, the interrogation questions may change. Similarly, interrogation questions may be varied if a user has incorrectly answered one or more questions. For example, if a user answers several questions incorrectly in a first line of questioning, the system may be configured to start another line of questioning to give the second user another chance. However, if the second user's performance does not improve, the interrogation may be discontinued. In a similar manner, when a second user resumes a prior interrogation session (or attempts to begin a new interrogation session), transcripts, results, and other data pertaining to that second user may be accessed to ensure that the trust assessment system does not present the same questions to the second user.

As noted above, the particular knowledge base, question sets, trust level determinations, and other aspects of the trust assessment process may be varied based on circumstances. In some embodiments, the process may be further varied based on utilizing information about users within the target user's social network. For purposes of clarity, such users are referred to herein as "pseudo-target users." For example, a particular second user may not be particularly knowledgeable about a target user, but may be a close friend of the target user's best friend. Accordingly, in some circumstances, that second user may be entitled to a greater degree of trust than a complete stranger. Trust assessment system 10 may be configured to address such situations by relying at least in part on knowledge base(s) of pseudo-target users (such as the best friend in the example above) for questions.

The degree to which the trust assessment system 10 relies upon pseudo-target user knowledge bases and the treatment of interrogation results derived from such outside knowledge may be specified by the target user. For example, the target user may provide that other knowledge bases may be consulted based on certain contingencies, such as a particular second user completely failing to demonstrate knowledge of information about the target user. As further example, a target user may provide that a second user answer questions about pseudo target users before answering questions about the target user.

Treatment of the results of interrogations based on pseudo-target user information may be varied, as well. For example, a target user may use the pseudo-target user's designated levels or scoring rules. Alternatively, the target user may modify the results based on the relationship between the target user and pseudo-target user. Such relationship information could be derived, for example, by reference to a social network system. For example, assume that a pseudo-target user provides a knowledge base and a set of questions to be scored on a scale from 0 to 100. A second user is interrogated on behalf of a target user using the pseudo-target user's knowledge base and questions and achieves a score of 77. For the pseudo-target user, such a score may correspond to a "high" trust level. However, the target user may discount the score (or amplify the score) based on who the pseudo-target user is. For example, after scoring the questions, the trust assessment system may discount the score by a factor based on the degree of separation between the target user and pseudo-target user so (from the target user's point of view) that the score of 77 corresponds to a "medium" trust level.

Of course, a particular target user may utilize other information from pseudo target users, such as questions, trust assessment interrogation routines and preferences, and the like. Furthermore, a target user may restrict or prohibit the use of any knowledge base or other information from use by outside users. For example, a target user may designate certain portions of a knowledge base as only usable on behalf of close friends, with other portions of the knowledge base off-limits to outsiders entirely.

An additional type of information associated with pseudo-target user that may be utilized includes the pseudo-target user's trust levels of various second users. As was noted above, during trust assessments, second users may be assigned a "zero" trust level in some circumstances, but in other circumstances, a second user may be provided with an initial nonzero trust level. Trust assessment system 10 may be configured to cross-reference determined trust levels and social network information to provide for a second user to receive credit for the trust of pseudo-target users, such as a target user's friends, co-workers, family, and the like.

For example, upon receipt of a trust assessment request regarding a second user, trust assessment server(s) 12 may be configured to initially check certain of a target user's social network contacts for calculated trust levels. Based on the calculated trust levels and the relationship(s) between the target user and the pseudo-target user(s), one or more pseudo-target users' previously-calculated trust level(s) with regard to the second user may be adjusted for purposes of the target user. The target user may provide for such trust levels to be amplified, discounted, or otherwise handled differently, or may provide for no special treatment in such situations.

Trust assessment system 10 may provide additional functionality with regard to a target user's knowledge base. For example, the system may support later alterations and maintenance through allowing a target user to login and adjust trust levels associated with information, add or delete personal information, alter trust assessment questions, and review logs and trust assessment session transcripts. Also, as part of the setup process, trust assessment system 10 may grade or otherwise evaluate the security of information provided by a target user. For example, the system may include analysis routines that indicate to a target user whether or not the target user's information is too general, or if specified answers are too specific for practical use.

Figure 5:
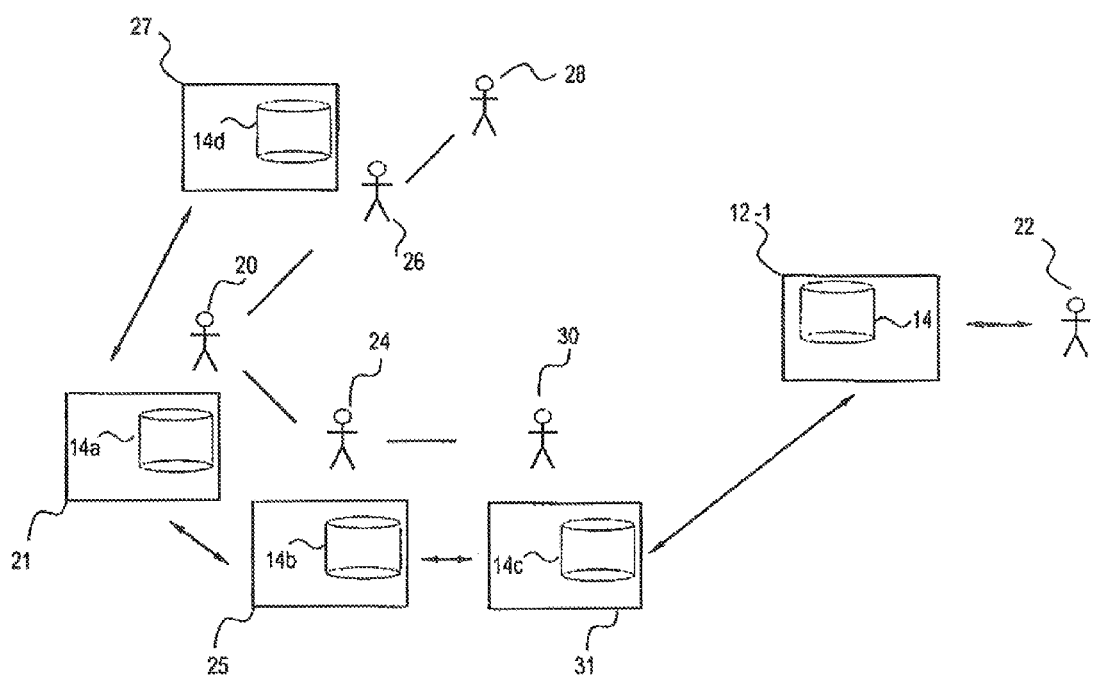
FIG. 5 is a diagram illustrating a plurality of networked computing devices and associated users utilizing a trust assessment system.

FIG. 5 illustrates an exemplary alternative embodiment of a trust assessment system. In this example, the trust assessment system 10 is distributed across a social network including target user 20. Target user 20's social network includes users 24, 26, 28, and 30. FIG. 5 also illustrates a plurality of computing devices associated with several users in the social network. Target user 20 utilizes machine 21, social network user 24 utilizes device 25, social network user 26 utilizes device 27, and social network user 30 utilizes device 31. Social network user 28 may also utilize one or more computing devices for participation in the social network, but his device(s) are not shown. Second user 22 will, of course, interact with the trust assessment system via one or more computing devices (also not shown).

FIG. 5 also illustrates an exemplary embodiment of a social network server 12, denoted in FIG. 5 as server 12-1. Social network server 12-1 has access to knowledge base 14, which, as will be detailed further below, can be distributed to certain of the members of target user 20's social network. As was noted above, social network server 12-1 also has access to other resources including additional store 16 (not shown in FIG. 5); the additional resources may also be distributed across the social network or in any other suitable manner. For example, the trust assessment session transcripts, data defining trust assessment levels and associating target user data items with such levels, interrogation questions, interrogation response evaluation metrics, and the like may be distributed. The distribution of additional store 16 may be wholly independent of the distribution of knowledge base 14; of course, alternatively, portions of store 16, knowledge base 14 and/or any other components holding related data may be distributed together.

Server 12-1 may comprise one or more computing devices that supervise the trust assessment process and interact with second user 22. Furthermore, in the event the requesting user is a different entity from second user 22, server(s) 12-1 may interact with any such requesting user(s). In the example illustrated in FIG. 5, the trust assessment server functionality is provided by one or more separate computing devices 12 that are accessible across the social network. Although shown as connected to device 31, the other devices in the network may each maintain or create one or more direct or indirect paths to device 12.

One of skill in the art will note that server(s) 12-1 may represent a central server, a server proxy, or even server functionality distributed across the social network. For instance, if the members of the social network are participating in file sharing using a P2P application, each computing device such as 21, 25, 31, and 27 may include trust assessment server functionality which determines the level of 20 trust of any outside user (i.e. second user 22) attempting to access P2P network resources. Alternatively, computing devices in the P2P network may access (either directly or indirectly) one or more separate trust assessment servers 12-1 or other P2P network resources acting as servers. However, for ease of illustration, FIG. 5 shows server functionality provided by a separate device.

In the example shown in FIG. 5, knowledge base 14 is distributed across the social network. In this example, knowledge base 14 contains items of information associated with target user 20. However, one of skill in the art will recognize that each member of the social network may have its own knowledge base, with each member's knowledge base distributed accordingly. Computing devices acting as social network server(s) 12-1 interact with requesting users 18 and second users 22. However, server(s) 12-1 may have limited access to the contents of knowledge base 14. For example, users of the system may specify that highly personal/confidential information is to be stored at one or more local machines and not in a central server. Accordingly, each user may maintain a local knowledge base containing at least some, or possibly all, of their personal information. A local instance of all or part of target user 20's knowledge base 14 is illustrated in FIG. 5 at 14*a*. Distribution of the personal information may advantageously avoid consolidation of personal information and attendant security risks such as identity theft and/or data loss.

For example, target user 20 may specify that high-level personal information is stored at device 21 in knowledge store 14*a*. However, low-level personal information may be maintained at server 12-1. When interrogating a second user 22, server 12-1 may initially use locally-stored data. If the trust assessment session/interrogation requires access to higher-level data that is not stored locally, server 12-1 may turn to device 21. For example, server 12-1 may initiate a secured link to device 21 to access information needed for higher-level trust assessment. Alternatively, the entire trust assessment session may be handed over to device 21. The handoff may be limited to the high-trust-level assessment, with device 21 returning the trust assessment session to server 12-1 for completion, or may provide for device 21 to complete the trust assessment session and provide the results to server 12 for storage, logging, audit purposes, and the like.

Still further alternative exemplary embodiments distribute server functionality and/or user knowledge bases across the social network. For instance, server 12 may include a limited or reduced knowledge base 14 with regard to user 20 as in the previous example, with user 20 maintaining highly confidential personal data at his local device 21 in knowledge base 14*a*. However, portions of user 20's knowledge base may be distributed across his social network. For instance, user 20 may trust users 24 and 26 with some, but not all, of user 20's personal information. Accordingly, such information could be stored in knowledge bases 14*b* and 14*d* on devices 25 and 27, respectively. User 20 may also trust user 30, and so some of user 20's knowledge base could also be stored in distributed knowledge base component 14*c* on device 31. The division and distribution of knowledge bases could itself be based on assessed trust levels. Furthermore, the distribution may result in various users maintaining identical portions, partially overlapping portions, or wholly distinct portions of knowledge base 14.

Operation of such a distributed system could proceed as set forth in the examples above with regard to device 21. Server 12-1 may handle part of a trust assessment session and access and/or hand off trust assessment sessions to appropriate distributed components for completion. For example, each level of trust may be handled by a member of the social network having the requisite level of trust, with the trust assessment sessions moving closer to target user 20 as the second user 22's trust level progresses. As an alternative to a complete hand-oft, server 12-1 may coordinate activity among one or more distributed components.

In any of the above-illustrated distributed environments, server 12-1 or any devices acting in that capacity can maintain data specifying the network locations of the distributed resource(s). For instance, the locally-accessible knowledge base 14 may comprise network addresses specifying which machine(s) to access in order to obtain trust assessment questions and data. In some embodiments, server 12-1 may simply act as a gateway and immediately hand off trust assessment and other inquiries regarding trust assessment system 10 (e.g., knowledge base adjustments, audit trails) to another device in the network. The trust assessment system 10 may be further configured so that hand-offs are one way only as the trust assessment session proceeds up the scale of trust levels. Using such a configuration, users associated with particular computing devices could be prevented from determining which devices maintain additional knowledge base items (other than those devices immediately adjacent in network, of course).

Any of the above-discussed embodiments may utilize one or more virtual peers. Generally speaking, the virtual peer(s) may be used to hide the true trust assessment server 12 (12-1)

and/or any other computing devices providing trust assessment functionality from interrogated users and requesting users. For example, several users may each maintain respective knowledge bases and conduct trust assessment sessions by way of their respective computing devices. However, the respective computing devices may be interfaced with a single virtual peer such that the requesting and/or interrogated user(s) are not aware of the true device which is conducting the trust assessment session(s) and hosting the knowledge bases. In some such embodiments, trust assessment server 12 (12-1) itself exists only as a virtual peer which, as noted above, hands off trust assessment sessions to the appropriate user computing device(s). Exemplary embodiments of virtual peers are discussed in currently-pending U.S. patent application Ser. Nos. 11/536,868, 11/536,888, and 11/536,912, all filed Sep. 29, 2006 and assigned to Qurio Holdings, Inc.

Additional security measures may be implemented to protect the contents of knowledge base 14 regardless of type or extent of distribution. For example, access to knowledge base 14 may be controlled through use of any suitable security method, such as requiring a digital signature or encryption key for access.

One of skill in the art will recognize that distribution of knowledge base(s) to a computing device will entail the use of one or more applications, processes, etc. running on the computing device. For example, the computing device may receive a process configured to operate as a distributed component of software running on server 12 (12-1). Alternatively, helper applications, processes, and the like may be included as part of a trust assessment client program, for instance, or even an operating system. Alternatively, for embodiments in which the trust assessment system is integrated into one or more communication systems, the helper applications/processes may be incorporated into one or more client applications associated with such system(s). For example, a P2P content sharing system that includes trust assessment functionality may include knowledge base distribution functionality in P2P client applications. Similar functionality may be included in client applications, processes, and components for situations in which trust assessment server 12 (12-1)'s functionality is delegated to other devices.

EXAMPLE

The following scenario is set forth for purposes of illustration and example only. In this example, a target user 20 provides content, such as digital photos, for sharing via a content sharing system such as system 23 illustrated in FIG. 2. In this example, the content sharing system provides previews of shared photos, but allows users to control access to the actual photo by trust level. Although this example refers to server 12, one of skill in the art will recognize that server 12-1 and/or other embodiments of trust assessment server(s) are equally usable, including distributed embodiments.

As an initial matter, target user 20 sets up his trust assessment preferences and knowledge base by logging into the trust assessment system (or, by logging into the content sharing system if the trust assessment system is included as a component therein). Assuming target user 20 has not previously configured a knowledge base, he is then prompted to enter personal information. Exemplary prompts from the trust assessment system and target user 20's answers are listed below:

TABLE 2

Exemplary System Prompts and Target User Responses

| System Prompt | Target User 20's Response |
|---|---|
| What is your place of birth? | Raleigh, NC |
| What is your birth date? | Feb. 29, 1980 |
| What is your pet's name? | Spot |
| What is your current address? | 1313 Mockingbird Way |

After target user 20 has provided personal information, the trust assessment system then prompts target user 20 to classify the information into trust levels. In this exemplary system, the trust levels range from (O-Complete Stranger), (I-Near Stranger), (II-Acquaintance), (III-Friend) up to (IV-Trusted Friend). The system may also include an additional supervisory trust level such as (V-Self). The trust assessment system may suggest trust levels based on other users' classifications. For example, if most users classify the information provided in response to the "address" prompt as (I-Near Stranger), it may suggest that trust level for confirmation. Target user 20's classification results are listed below:

TABLE 3

Exemplary System Prompts, Target User Responses, and Trust Levels

| System Prompt | Target User 20's Response | Trust Level |
|---|---|---|
| What is your place of birth? | Raleigh, NC | III—Friend |
| What is your birth date? | Feb. 29, 1980 | II—Acquaintance |
| What is your pet's name? | Spot | III—Friend |
| What is your current address? | 1313 Mockingbird Way | I—Near Stranger |

The trust assessment system may note that target user 20 has not classified any information that could be used to qualify other users at level (IV-Trusted Friend). Therefore, the system may prompt target user 20 for additional information. In some embodiments, the trust assessment system may prompt target user 20 with suggested questions for trust level (IV-Trusted Friend) based on the type of data other users of the trust assessment system associated with level IV information. Alternatively or additionally, target user 20 may be given the option to provide information that is not based on a pre-generated question or prompt. For instance, in this example, assume that target user 20 specifies his lucky number (forty-two) and associates that item with trust level (IV-Trusted Friend).

The trust assessment system may then generate questions to be associated with each item of information. For the custom information (the lucky number), target user 20 may be prompted to input the question into the system; target user 20 provides for a prompt stating "Enter [target user 20's] lucky number." Furthermore, target user 20 may input custom questions for each item or alter the pre-generated questions. In some systems, items of information associated with commonly-used information, such as information provided in response to trust assessment system prompts, may rely on pre-generated questions that are accessed at the time of a trust assessment session.

In this example, assume target user 20 specifies that all of his information may be presented as multiple-choice questions except for his "lucky number" question, which must receive an exact textual match and accepts the pre-generated question formatting. Furthermore, target user 20 specifies that his address and birth date must be provided within 30 seconds.

Target user 20's items of personal information are stored as a knowledge base, with the items associated with the specified trust levels and questions. Based on privacy concerns, target user 20 specifies that his knowledge base is not to be stored on the central server, but may be distributed to users based on trust level. Since target user 20 is the only user known to the system at setup time, the trust assessment system uploads target user 20's knowledge base to his local machine and registers data indicating target user 20's network address.

Target user 20 then specifies trust level-based limitations on his shared content. In the content sharing system of this example, the content sharing server controls access to full versions of photos by acting as a proxy for requests for shared content. The content sharing server provides previews of target user 20's photos and screens requests for the full content by trust level. If a user who wishes to view a photo is sufficiently trusted, the user receives a reference to the actual photo. Target user 20 specifies the following settings for three shared photos, with one photo having two different versions:

TABLE 4

Target User 20's Sharing Trust Preferences

| Photo File | Required Trust Level |
|---|---|
| 001.jpg | 0 (All may access) |
| 002.jpg (full resolution) | III and above |
| 002.jpg (reduced resolution) | II and above |
| 003.jpg | IV and above |

With target user 20's knowledge base assembled and trust level parameters associated with his shared content, operation of the exemplary embodiment of the trust assessment system will now be discussed with regard to trust assessments. For instance, target user 20 may participate in a social network such as the one shown in FIG. 5 and comprising target user 20, 24, 26, 28, and 30. Assume that target user 20 notifies social network users 24 and 30 of the shared photos. Each of users 24 and 30 may undergo trust assessment in order to view the shared photos, except for photo "001.jpg," which requires no trust level for access.

User 30 may wish to view photo "002.jpg" at full resolution. Accordingly, user 30 contacts the content sharing system and requests access. Based on target user 20's sharing preferences, the content sharing system sends a trust assessment request 50-1 to trust assessment server 12. In this example, the trust assessment request includes the following parameters:

TABLE 5

Exemplary Trust Assessment Request 50-1

| Request 50-1 Parameter | Value |
|---|---|
| Target User | user 20 |
| Second User | user 30 |
| Minimal Trust level | III |
| Result URL | (content sharing system address) |
| Completion URL | (reference to photo 002.jpg) |

Trust assessment server 12 receives request 50-1 and searches previously-stored trust levels for any data regarding target user 20's trust level with regard to user 30. Since no such data is available, the trust assessment server initiates a trust assessment session. User 30 is directed to a secured link with trust assessment server 12. In this example, the trust assessment session is conducted by server 12 initially using data accessed from the distributed knowledge base 14*a* via a secured link to machine 21 (i.e. user 20's computing device). However, in an alternative embodiment, server 12 may hand off all or part of the trust assessment session to machine 21.

Server 12 initially prompts user 30 to select the correct address for target user 20 from a multiple-choice list. Since target user 20 specified a time limit for this question, if user 30 does not make a selection within 30 seconds, the trust assessment session ends. Assuming user 30 selects "1313 Mockingbird Lane," trust assessment server increments user 30's trust level to level (I). User 30 is then prompted to select target user 20's date of birth from another multiple-choice list, again with a time limit. If user 30 selects the correct answer, his trust level is incremented to level (II). Then, user 30 is presented with one of the questions corresponding to level (III). In this example, target user 20 has specified that one question is to be selected at random. However, other options could have included presenting both questions and requiring both to be answered correctly, or one of the two to be answered correctly. In this case, the "date of birth" question is presented, and user 30 selects the correct date.

Since trust level (III) is the level required to access the desired resource (photo 002.jpg), user 30 exits the trust assessment process and is redirected to an address to access photo002.jpg. In this example, trust assessment server 12 redirects user 30 based on the redirection data included in the trust assessment request. However, in other embodiments, trust assessment server 12 may return the trust level to the appropriate content sharing system resource(s) and redirect user 30 to the resource(s) so such resource(s) could handle the redirection of user 30 to the content. Additionally, user 30's trust level is stored in a form accessible to trust assessment server 12 for use in later requests (if appropriate). For instance, if target user 20 has not provided for expiration of trust assessment results, user 30 may request content such as photo002.jpg (reduced resolution) without having to undergo trust assessment again.

Additionally, target user 20 has provided that elements of his knowledge base can be distributed to trusted members of his social network. Accordingly, data comprising store 14*c* is transferred to computing device 31. For example, machine 21 may push data to device 31 over a secure link. Store 14*c* can contain a portion of target user 20's data items. In this embodiment, store 14*c* contains all data items at trust level (III) and below. However, in alternate configurations, store 14*c* could be limited to fewer levels of information.

Sometime later, User 24 may wish to view photo "003.jpg." Accordingly, user 24 contacts the content sharing system and requests access. Based on target user 20's sharing preferences, the content sharing system sends a trust assessment request 50-2 to trust assessment server 12. In this example, the trust assessment request includes the following parameters:

TABLE 6

Exemplary Trust Assessment Request 50-2

| Request 50-2 Parameter | Value |
|---|---|
| Target User | user 20 |
| Second User | user 24 |
| Minimal Trust Level | IV |
| Result URL | (content sharing system address) |
| Completion URL | (reference to photo 003.jpg) |

Trust assessment server 12 receives request 50-2 and searches previously-stored trust levels for any data regarding target user 20's trust level with regard to user 24. Since no such data is available, the trust assessment server initiates a trust assessment session. In this example, the trust assessment session is conducted by server 12 initially using data from the distributed knowledge base 14c via a secured link to machine 31 (i.e. user 30's computing device). However, in an alternative embodiment, server 12 may hand off all or part of the trust assessment session to machine 31. If machine 31 is unavailable, server 12 may turn to an alternate resource, such as machine 21 which includes access to store 14a.

Server 12 initially prompts user 24 to select the correct address for target user 20 from a multiple-choice list. As was the case with user 30, since target user 20 specified a time limit for this question, if user 24 does not make a selection within 30 seconds, the trust assessment session ends. Assuming user 24 selects "1313 Mockingbird Lane," trust assessment server increments user 24's trust level to level (I). User 24 is then prompted to select user 20's date of birth from another multiple-choice list, again with a time limit. If user 24 selects the correct answer, his trust level is incremented to level (II). Then, user 24 is presented with one of the questions corresponding to level (III). As noted above, target user 20 has specified that one question is to be selected at random. In this case, assuming that user 24 is presented with the multiple choice question "[user 20]'s pet's name is: . . . " and correctly selects "Spot," user 24's trust level is incremented to level (III).

In this example, store 14c only contains information up to user 30's trust level-that is, store 14c contains none of target user 20's information beyond level (III). Therefore, trust assessment server 12 initiates a secure link to the full store maintained at 14a on machine 21 (I.e. target user 20's computing device). Alternatively, the trust assessment session may be handed off in its entirety to machine 21. User 24 is presented with the prompt "Enter [target user 20]'s favorite number." Assuming user 24 correctly types "42," his trust level is incremented to level (IV). Since this is the level required to access the desired resource (photo "003.jpg"), user 24 exits the trust assessment process and is redirected to download photo "003.jpg." Additionally, user 24's trust level is stored in a form accessible to trust assessment server 12 for use in later requests (if appropriate). For instance, if target user 20 has not provided for expiration of trust assessment results, user 24 may request content such as photo002.jpg (full resolution) without having to undergo trust assessment again. Furthermore, all or part of target user 20's data store may be distributed to knowledge store 14b at machine 25 (i.e. user 24's computing device) for future use in trust assessment sessions.

The above example may be modified in any suitable way, including by incorporating additional features, such as those discussed elsewhere in this disclosure. For example, as part of assembling target user 20's knowledge base, trust assessment server(s) 12 may access one or more social network systems and obtain data regarding target user 20's friends, co-workers and other contacts. If such data indicates that user 26 is target user 20's "closest friend," the designation may be presented for target user 20 for confirmation and inclusion in the knowledge base. Furthermore, target user 20 may designate the "closest friend" question as a gateway question such that no user can obtain a trust level without correctly identifying the answer (i.e. user 26). Additionally, target user 20 may specify parameters for naming one or more pseudo-target users for alternative interrogation scenarios. For instance, continuing with the example above, target user 20 may specify that data about "closest friends" may be used for some or all of the interrogation process. Continuing with the example above, user 26 may be treated as a pseudo-target user for some trust assessments. Accordingly, if user 28, for example, is unknowledgeable about target user 20, user 28 may nonetheless be entitled to some trust from target user 20 (assuming, of course, that user 28 correctly identifies information about target user 20's closest friend, user 26).

Presently-disclosed examples of trust assessment systems and uses thereof are meant for the purposes of illustration only. Various arrangements and configurations of trust assessment systems may be accessed by and/or integrated with other computer-based systems that require determination of a level of trust between users. Trust assessments may be used to control access to the following, which are provided by way of non-limiting example: P2P groups, digital content and other resources, contact information, communications resources, computing devices, and network resources.

It is appreciated by persons skilled in the art that what has been particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed:

1. A system for determining trust, the system comprising:
a non-transitory computer-readable media having a first knowledge base and a second knowledge base different from the first knowledge base stored thereon;
a computing device having a processor in communication with the knowledge bases, the computing device configured to:
receive a request to establish a relationship between a target user and a second user;
access trust assessment data including data associated with the target user based on the relationship between the target user and the second user and a plurality of data items where each data item is associated with a trust level, wherein the trust assessment data is selected from either the first knowledge base or the second knowledge base according to the relationship;
interrogate the second user, including presenting, to the second user, at least one trust assessment question based on the trust assessment data where the at least one trust assessment question is based on the relationship between the target user and the second user;
receive response data from the second user during the interrogation;
score the second user's response to the at least one trust assessment question by comparing the response to the trust assessment data corresponding to the at least one trust assessment question;
generate trust assessment result data based on the interrogation results, wherein the computing device is configured to score and assign a trust level during generation of the trust assessment result data; and
store the trust assessment result data.

2. The system as set forth in claim 1, wherein the trust assessment data includes a plurality of data items and each data item is associated with a trust level, the computing device further configured to:
receive response data from the second user during the interrogation;
determine the extent to which the response data matches at least one data item when generating trust assessment result data; and assign a trust level to the second user based on a highest trust level associated with the at least one matched data item.

3. The system as set forth in claim 1, wherein the trust assessment data includes a plurality of data items, each data item associated with a trust level, wherein the computing device is further configured to:
provide a plurality of trust assessment questions to the second user and receive response data from the second user during interrogation;
score the second user's response to each of the plurality of questions by comparing the response for each question to the trust assessment data corresponding to that question;
aggregate the scores; and
assign a trust level to the second user based on the aggregated score, wherein the computing device is configured to score, aggregate, and assign a trust level during generation of the trust assessment result data.

4. The system as set forth in claim 1, wherein the computing device is further configured to:
access a plurality of stored trust assessment questions;
select at least some of the plurality of trust assessment questions; and
present the selected questions to the second user where the computing device accesses, selects, and presents the selected questions during interrogation.

5. The system as set forth in claim 4, wherein the second user is classified based at least in part on determining a relationship between the second user and the target user where determining the relationship includes accessing data defining a social network including the second user and the target user.

6. The system as set forth in claim 5, wherein the computing device is further configured to classify where at least some of the plurality of questions are selected based on the classification of the second user.

7. The system as set forth in claim 5, wherein the second user is classified based at least in part on data identifying at least one prior trust assessment session including the second user.

8. The system as set forth in claim 1, wherein the computing device is further configured to:
send at least one message to the target user after the interrogation of the second user has commenced; and
modify the target user's trust level of the second user based on data received from the target user in response to the at least one message.

9. The system as set forth in claim 1, wherein the request includes at least one result address and one or more exit criteria and the computing device is further configured to:
determine whether the exit criteria are satisfied during generation of the trust assessment result data; and
send data including the trust assessment result data to the at least one result address, wherein the exit criteria include an exit trust level and the exit criteria are satisfied once the computed trust level meets or exceeds the exit trust level.

10. The system as set forth in claim 1, wherein the computing device is associated with a peer-to-peer network.

11. The system as set forth in claim 1, wherein the target user and the second user have a pre-existing relationship and the computing device is further configured to:
establish the relationship between the target user and the second user based on the pre-existing relationship.

\* \* \* \* \*